United States Patent
Goelet

(10) Patent No.: US 9,745,042 B2
(45) Date of Patent: Aug. 29, 2017

(54) AIRSHIP INCLUDING AERODYNAMIC, FLOATATION, AND DEPLOYABLE STRUCTURES

(71) Applicant: LTA CORPORATION, New York, NY (US)

(72) Inventor: John Goelet, Washington, DC (US)

(*) Notice: Subject to any disclaimer, the term of this patent is extended or adjusted under 35 U.S.C. 154(b) by 0 days.

(21) Appl. No.: 15/242,223

(22) Filed: Aug. 19, 2016

(65) Prior Publication Data

US 2016/0355248 A1 Dec. 8, 2016

Related U.S. Application Data

(62) Division of application No. 14/058,410, filed on Oct. 21, 2013, now abandoned, which is a division of
(Continued)

(51) Int. Cl.
| | |
|---|---|
| *B64B 1/02* | (2006.01) |
| *B64B 1/68* | (2006.01) |
| *B64B 1/06* | (2006.01) |
| *B64B 1/12* | (2006.01) |
| *B64B 1/14* | (2006.01) |

(Continued)

(52) U.S. Cl.
CPC ............ *B64B 1/68* (2013.01); *B64B 1/00* (2013.01); *B64B 1/06* (2013.01); *B64B 1/12* (2013.01); *B64B 1/14* (2013.01); *B64B 1/20* (2013.01); *B64B 1/22* (2013.01); *B64B 1/34* (2013.01); *B64B 1/58* (2013.01); *B64B 1/60* (2013.01); *B64C 25/32* (2013.01); *B64C 25/56* (2013.01); *B64B 2201/00* (2013.01); *B64D 2211/00* (2013.01)

(58) Field of Classification Search
None
See application file for complete search history.

(56) References Cited

U.S. PATENT DOCUMENTS

| | | |
|---|---|---|
| 1,027,590 A | 5/1912 | Bucher |
| 1,350,211 A | 8/1920 | Corson, Jr. |

(Continued)

FOREIGN PATENT DOCUMENTS

| | | |
|---|---|---|
| CA | 1054124 A | 5/1979 |
| DE | 210003 | 5/1909 |

(Continued)

OTHER PUBLICATIONS

21$^{st}$ Century Airships Web Site, accessed Jun. 22, 2007, http://www.21stcenturyairships.com (1 page).
(Continued)

*Primary Examiner* — Medhat Badawi
(74) *Attorney, Agent, or Firm* — Finnegan, Henderson, Farabow, Garrett & Dunner LLP

(57) ABSTRACT

An airship is provided. The airship includes a hull configured to contain a gas, at least one propulsion assembly coupled to the hull and including a propulsion device, and at least one aerodynamic component including a plurality of fairing structures including one or more slats, wherein the at least one aerodynamic component is associated with the hull and is configured to direct airflow around the airship.

15 Claims, 33 Drawing Sheets

Related U.S. Application Data application No. 13/430,010, filed on Mar. 26, 2012, now Pat. No. 8,596,571.

(60) Provisional application No. 61/470,025, filed on Mar. 31, 2011.

(51) Int. Cl.

| | | |
|---|---|---|
| *B64B 1/20* | (2006.01) | |
| *B64B 1/22* | (2006.01) | |
| *B64B 1/34* | (2006.01) | |
| *B64B 1/60* | (2006.01) | |
| *B64C 25/32* | (2006.01) | |
| *B64C 25/56* | (2006.01) | |
| *B64B 1/00* | (2006.01) | |
| *B64B 1/58* | (2006.01) | |

(56) References Cited

U.S. PATENT DOCUMENTS

| | | | |
|---|---|---|---|
| 1,685,458 A | | 9/1928 | Lidback |
| 1,944,467 A | | 1/1934 | Sabin |
| 2,286,014 A | | 6/1942 | Rowe |
| 2,365,827 A | | 12/1944 | Liebert |
| 2,379,355 A | | 6/1945 | Hodgdon |
| 2,563,263 A | * | 8/1951 | Nicholl .................. B64C 35/003 244/102 SL |
| 2,935,275 A | | 5/1960 | Grayson |
| 3,176,937 A | * | 4/1965 | Labrecque .............. B64C 25/56 244/101 |
| 3,321,158 A | * | 5/1967 | Di Stasi .............. B64C 29/0091 244/105 |
| 3,337,845 A | | 8/1967 | Hart |
| 3,395,877 A | | 8/1968 | McFadden et al. |
| 3,432,120 A | | 3/1969 | Guerrero |
| D213,731 S | | 4/1969 | Hsi |
| 3,467,343 A | * | 9/1969 | Violleau .................. B64C 25/56 244/101 |
| 3,477,168 A | | 11/1969 | Trodglen, Jr. |
| 3,529,283 A | | 9/1970 | Emerson et al. |
| 3,580,636 A | | 5/1971 | Setto |
| 3,706,433 A | * | 12/1972 | Sonstegaard ............. B64B 1/60 244/128 |
| 3,820,744 A | | 6/1974 | Denton |
| RE28,454 E | | 6/1975 | Fitzpatrick et al. |
| 3,946,364 A | | 3/1976 | Codomo et al. |
| 3,970,270 A | | 7/1976 | Pittet, Jr. |
| 3,971,533 A | | 7/1976 | Slater |
| 3,976,265 A | | 8/1976 | Doolittle |
| 4,085,912 A | | 4/1978 | Slater |
| 4,269,375 A | | 5/1981 | Hickey |
| 4,298,175 A | | 11/1981 | Earl |
| 4,326,681 A | | 4/1982 | Eshoo |
| 4,461,436 A | | 7/1984 | Messina |
| D274,999 S | | 8/1984 | Reeves |
| D280,194 S | | 8/1985 | Bothe |
| 4,583,094 A | | 4/1986 | Mosier |
| 4,685,640 A | | 8/1987 | Warrington et al. |
| D305,418 S | | 1/1990 | Blake |
| 4,901,948 A | | 2/1990 | Panos |
| D307,131 S | | 4/1990 | Kramer |
| 4,914,976 A | | 4/1990 | Wyllie |
| D307,884 S | | 5/1990 | Ninkovich |
| D309,887 S | | 8/1990 | Ninkovich |
| 5,096,141 A | | 3/1992 | Schley |
| 5,170,963 A | | 12/1992 | Beck, Jr. |
| 5,240,206 A | | 8/1993 | Omiya |
| 5,281,960 A | | 1/1994 | Dwyer |
| 5,348,251 A | | 9/1994 | Ferguson |
| 5,351,911 A | | 10/1994 | Neumayr |
| 5,368,256 A | | 11/1994 | Kalisz et al. |
| 5,516,060 A | | 5/1996 | McDonnell |
| 5,614,897 A | | 3/1997 | Durnford |
| 5,675,327 A | | 10/1997 | Coirier et al. |
| 5,755,402 A | | 5/1998 | Henry |
| 5,823,468 A | | 10/1998 | Bothe |
| 5,906,335 A | | 5/1999 | Thompson |
| D418,804 S | | 1/2000 | Glasgow et al. |
| 6,010,093 A | | 1/2000 | Paulson |
| 6,019,312 A | | 2/2000 | Blenn |
| D424,508 S | | 5/2000 | Hankinson et al. |
| 6,164,589 A | | 12/2000 | Kallsz |
| 6,196,498 B1 | | 3/2001 | Eichstedt et al. |
| 6,231,007 B1 | | 5/2001 | Schafer |
| 6,286,783 B1 | | 9/2001 | Kuenkler |
| 6,302,357 B1 | | 10/2001 | Kalisz |
| 6,311,925 B1 | | 11/2001 | Rist |
| 6,315,242 B1 | | 11/2001 | Eichstedt et al. |
| 6,328,257 B1 | | 12/2001 | Schafer |
| 6,439,508 B1 | | 8/2002 | Taylor |
| 6,549,179 B2 | | 4/2003 | Youngquist et al. |
| 6,565,037 B1 | | 5/2003 | Tonkovich |
| 6,577,929 B2 | | 6/2003 | Johnson et al. |
| 6,648,272 B1 | | 11/2003 | Kothmann |
| 6,659,838 B1 | | 12/2003 | Anderson |
| 6,702,229 B2 | | 3/2004 | Anderson et al. |
| 6,880,783 B2 | | 4/2005 | Munk |
| 6,885,313 B2 | | 4/2005 | Selk et al. |
| 6,892,118 B1 | | 5/2005 | Feyereisen |
| 6,966,523 B2 | | 11/2005 | Colting |
| 7,040,572 B2 | | 5/2006 | Munk |
| 7,055,777 B2 | | 6/2006 | Colting |
| 7,108,228 B1 | | 9/2006 | Marshall |
| 7,137,592 B2 | | 11/2006 | Barocela et al. |
| 7,156,342 B2 | | 1/2007 | Heaven, Jr. et al. |
| 7,159,817 B2 | | 1/2007 | VanderMey et al. |
| 7,216,069 B2 | | 5/2007 | Hett |
| D583,294 S | | 12/2008 | Balaskovic |
| 7,825,830 B2 | | 11/2010 | Joyner |
| 7,866,601 B2 | | 1/2011 | Balaskovic |
| 8,177,161 B2 | | 5/2012 | Morehead et al. |
| 8,286,909 B2 | | 10/2012 | Lee |
| 8,286,910 B2 | | 10/2012 | Alavi |
| 8,336,810 B2 | | 12/2012 | Brutoco |
| 8,342,442 B1 | | 1/2013 | Dancila |
| 2001/0002686 A1 | | 6/2001 | Yokomaku et al. |
| 2002/0003189 A1 | | 1/2002 | Kuenkler |
| 2002/0109045 A1 | | 8/2002 | Beach et al. |
| 2003/0001044 A1 | | 1/2003 | Munk |
| 2003/0023355 A1 | | 1/2003 | Johnson et al. |
| 2003/0127557 A1 | | 7/2003 | Anderson et al. |
| 2003/0234320 A1 | | 12/2003 | Colting |
| 2004/0162000 A1 | | 8/2004 | Anderson |
| 2005/0277359 A1 | | 12/2005 | Anderson |
| 2006/0016930 A1 | | 1/2006 | Pak |
| 2006/0060695 A1 | | 3/2006 | Walden et al. |
| 2006/0065777 A1 | | 3/2006 | Walden et al. |
| 2006/0151666 A1 | | 7/2006 | VanderMey et al. |
| 2006/0227013 A1 | | 10/2006 | Harvison et al. |
| 2006/0261213 A1 | | 11/2006 | Lavan |
| 2006/0284002 A1 | | 12/2006 | Stephens et al. |
| 2007/0034740 A1 | | 2/2007 | Li |
| 2007/0075184 A1 | | 4/2007 | Marimon et al. |
| 2007/0295859 A1 | | 12/2007 | Colvin |
| 2008/0087762 A1 | | 4/2008 | Holloman et al. |
| 2008/0179454 A1 | * | 7/2008 | Balaskovic .............. B64B 1/06 244/30 |
| 2009/0109064 A1 | | 4/2009 | Joyner |
| 2009/0189012 A1 | | 7/2009 | Liggett |
| 2009/0200416 A1 | | 8/2009 | Lee |
| 2009/0321557 A1 | | 12/2009 | Colting |
| 2010/0044506 A1 | * | 2/2010 | Smith ..................... B64C 25/10 244/101 |
| 2010/0067118 A1 | | 3/2010 | Takahashi et al. |
| 2010/0076628 A1 | | 3/2010 | Boorman et al. |
| 2010/0102164 A1 | | 4/2010 | Brutoco |
| 2010/0252687 A1 | | 10/2010 | Hogan |
| 2010/0276546 A1 | * | 11/2010 | Im ............................ B64B 1/28 244/171.1 |
| 2010/0320314 A1 | | 12/2010 | Balaskovic |
| 2011/0051041 A1 | | 3/2011 | Yashiro |
| 2011/0163200 A1 | | 7/2011 | Balaskovic |
| 2011/0174922 A1 | | 7/2011 | Berman et al. |

(56) References Cited

U.S. PATENT DOCUMENTS

| | | |
|---|---|---|
| 2012/0018571 A1 | 1/2012 | Goelet |
| 2012/0199693 A1* | 8/2012 | Regas ............... B64B 1/005 244/30 |
| 2012/0212228 A1 | 8/2012 | Cho et al. |
| 2014/0231580 A1* | 8/2014 | Goelet ............... B64B 1/06 244/30 |

FOREIGN PATENT DOCUMENTS

| | | |
|---|---|---|
| DE | 26 40 433 A1 | 4/1977 |
| DE | 3508101 A1 | 9/1986 |
| DE | 10011319 A1 | 9/2001 |
| DE | 20116152 U1 | 2/2002 |
| DE | 10058072 A1 | 6/2002 |
| DE | 20204023 U1 | 7/2002 |
| DE | 10120232 A1 | 10/2002 |
| DE | 10121854 C1 | 11/2002 |
| DE | 10139877 A1 | 2/2003 |
| DE | 10143589 A1 | 4/2003 |
| DE | 10148590 A1 | 4/2003 |
| DE | 10201133 A1 | 7/2003 |
| DE | 10210541 A1 | 9/2003 |
| DE | 10210542 A1 | 9/2003 |
| DE | 10216480 A1 | 10/2003 |
| DE | 10226868 A1 | 12/2003 |
| DE | 10228048 A1 | 1/2004 |
| DE | 10252695 A1 | 5/2004 |
| DE | 10252896 A1 | 5/2004 |
| DE | 10252908 A1 | 5/2004 |
| DE | 10252909 A1 | 5/2004 |
| DE | 10252910 A1 | 5/2004 |
| DE | 10252911 A1 | 5/2004 |
| DE | 10 2005 013529 A1 | 6/2007 |
| EP | 0 095 763 A2 | 12/1983 |
| EP | 0 282 425 A1 | 9/1988 |
| EP | 0 291 355 A2 | 11/1988 |
| EP | 0 503 801 A2 | 9/1992 |
| EP | 0 619 792 B1 | 10/1994 |
| EP | 0 714 362 B1 | 6/1996 |
| EP | 0 729 423 B1 | 9/1996 |
| EP | 0 745 045 B1 | 12/1996 |
| EP | 1 070 008 B1 | 1/2001 |
| EP | 1 160 156 A2 | 12/2001 |
| EP | 1 292 474 B1 | 3/2003 |
| EP | 1 294 608 B1 | 3/2003 |
| EP | 1 451 063 B1 | 9/2004 |
| EP | 1 529 726 A2 | 5/2005 |
| EP | 1 770 009 A2 | 4/2007 |
| FR | 2 630 397 A1 | 10/1989 |
| FR | 2830838 B1 | 4/2003 |
| GB | 2 055 728 A | 3/1981 |
| GB | 2 197 276 A | 5/1988 |
| GB | 2 250 007 A | 5/1992 |
| GB | 2 275 036 A | 8/1994 |
| GB | 2 278 815 A | 12/1994 |
| GB | 2 300 010 A | 10/1996 |
| GB | 2 359 534 A | 8/2001 |
| GB | 2 366 274 A | 3/2002 |
| JP | 52 145999 | 12/1977 |
| RU | 37568 | 10/1993 |
| RU | 2009073 C1 | 3/1994 |
| RU | 40822 S | 1/1995 |
| RU | 2028249 C1 | 2/1995 |
| RU | 2070136 C1 | 12/1996 |
| RU | 2092381 C1 | 10/1997 |
| RU | 2098318 C1 | 12/1997 |
| RU | 2111146 C1 | 5/1998 |
| RU | 2111147 D1 | 5/1998 |
| RU | 20114027 C1 | 6/1998 |
| RU | 2141911 C1 | 11/1999 |
| RU | 2196703 C2 | 1/2003 |
| RU | 2249536 C1 | 4/2005 |
| RU | 2250122 C1 | 4/2005 |
| SU | 1799335 A3 | 2/1993 |
| UA | 10870 A | 12/1996 |
| UA | 32397 A | 12/2000 |
| UA | 55928 A | 4/2003 |
| WO | WO 92/06002 A1 | 4/1992 |
| WO | WO 93/13979 A1 | 7/1993 |
| WO | WO 93/24364 A2 | 12/1993 |
| WO | WO 95/05307 A1 | 2/1995 |
| WO | WO 95/14607 A1 | 6/1995 |
| WO | WO 95/22486 A1 | 8/1995 |
| WO | WO 95/27652 A1 | 10/1995 |
| WO | WO 95/32893 A1 | 12/1995 |
| WO | WO 95/32894 A1 | 12/1995 |
| WO | WO 96/38340 A1 | 12/1996 |
| WO | WO 97/15492 | 5/1997 |
| WO | WO-97/49606 A1 | 12/1997 |
| WO | WO 98/28188 A1 | 7/1998 |
| WO | WO 98/29303 A2 | 7/1998 |
| WO | WO 98/31589 A1 | 7/1998 |
| WO | WO 99/67131 A1 | 12/1999 |
| WO | WO 00/48902 A1 | 8/2000 |
| WO | WO 00/73142 A2 | 12/2000 |
| WO | WO 01/42082 A1 | 6/2001 |
| WO | WO 01/68447 A2 | 9/2001 |
| WO | WO 01/94172 A1 | 12/2001 |
| WO | WO 03/021291 A1 | 3/2003 |
| WO | WO 03/047967 A1 | 6/2003 |
| WO | WO 03/055745 A1 | 7/2003 |
| WO | WO 03/055746 A1 | 7/2003 |
| WO | WO 03/074356 A2 | 9/2003 |
| WO | WO 03/097450 A1 | 11/2003 |
| WO | WO 03/097451 A1 | 11/2003 |
| WO | WO 2004/000642 A1 | 12/2003 |
| WO | WO 2004/074091 A2 | 9/2004 |
| WO | WO 2004/087499 A2 | 10/2004 |
| WO | WO 2005/002960 A1 | 1/2005 |
| WO | WO 2005/007508 A1 | 1/2005 |
| WO | WO 2006/061617 A1 | 6/2006 |
| WO | WO 2006/085919 A2 | 8/2006 |
| WO | WO 2006/137880 A2 | 12/2006 |
| WO | WO 2007/036038 A1 | 4/2007 |
| WO | WO 2007/037932 A2 | 4/2007 |
| WO | WO 2007/045091 A1 | 4/2007 |
| WO | WO 2007/065649 A2 | 6/2007 |

OTHER PUBLICATIONS

ALA-40 proof-of-concept—Thermoplane, Photos from "Janes—All the World's Aircraft," 1997 (2 pages).
Ben Ionnatta, "Spy Blimps and Heavy Lifters: The Latest Thing in Airships," Air & Space Smithsonian, Sep. 2007, (2 pages).
Blimp Europs N2A Web Site, accessed Oct. 11, 2006, machine translated Jun. 25, 2007, http://www.blimp-n2a.com/cl5alpha.htm (3 pages).
CargoLifter Web Site, accessed Jun. 19, 2007, http://cargolifter.info (2 pages).
Daniel P. Raymer, "Aircraft Design: A Conceptual Approach," 4th Ed., 2006, pp. 652-659, American Institute of Aeronautics and Astronautics, Inc., Reston, Virginia (11 pages).
Demonstrator Alpha, Lenticular Aircraft of Air Photoraphy, accessed Oct. 11, 2006, machine translated Jun. 25, 2007, http://perso.orange.fr/balaskovic/actu-texte.html (2 pages).
Dynalifter Web Site, accessed Jun. 22, 2007, http://www.dynalifter.com (7 pages).
"Lift Equations." derived from "The Non-Rigid Airstrip Test and Evaluation Manual," U.S. Navy, 1940 (2 pages).
Michael A. Dornhelm, "Skunks Working," Aviation Week, Feb. 6, 2006, accessed Jun. 22, 2007, http://www.aviationweek.com/aw/generic/story_generic.jsp?channel=awst&id=news/020606p2.xml (2 pages).
Gabriel A. Khoury and J. David Gillett, "Lenticular Mathematics," an excerpt from "Airship Technology," Cambridge University Press, 1999 (6 pages).
Lord Ventry and Eugene Kolesnik, Excerpt from "Jane's Pocket Book of Airships," Collier Books, 1977, pp. 94-96.
Edwin Mowforth, "lenticular history," an excerpt from "An Introduction to the Airship," Second Edition. 2001, (6 pages).

(56) References Cited

OTHER PUBLICATIONS

Operation-LTA Web Site, accessed Oct. 11, 2006, http://web.archive.org/web/20040405173243/www.operation-lta.com (5 pages).
Stepharie Doncieux and Jean-Arcady Meyer, "Evolving Neural Networks for the Control of a Lenticular Blimp," AnimatLab—LIP6. 2003 France, http://animatlab.lip6.fr (12 pages).
Thomas F. Norton, "Now There's a 'Personal Blimp:' Unique Foldable Frame Makes it Practical as a Second Century Aircraft," General Aviation News, Jan. 19, 2007, p. 18-19, $59^{th}$ year, No. 2, Flyer Media, Inc., Lakewood, WA (2 pages).
Worldwide Aeros Corporation Web Site, accessed Jun. 22, 2007, http://www.aerosml.com (4 pages).
Yu. Boiko and V.A. Turian, "Dreamboat of Centuries," Moscow, Machine Buuilding, p. 52, Jun. 13, 1991 (2 pages).
U.S. Army Advanced Materiel Concepts Agency, "Aerial Very Heavy Lift Concepts for the 1990 Army vol. I", Basic Report, Nov. 1969 (41 pages).
U.S. Army Advanced Materiel Concepts Agency, "Aerial Very Heavy Lift Concepts for the 1990 Army vol. III," Academic and Industrial Presentations, Nov. 1, 1969 (200 pages).
Boeing Vertol Company for NASA Ames., "Feasibility Study of Modern Airships", Final Report, vol. 1, May 1975 (478 pages).
P.A. Mackrodt, "Further Studies in the Concept of Delta-Winged Hybrid Airships", J. Aircraft, Oct. 1, 1980, pp. 734-740.
Mark D. Ardema, "Missions and Vehicle Concepts for Modern, Propelled, Lighter-Than-Air Vehicles", Agard. Nato, Feb. 1985 (50 pages).
Dr. R.S. Ross et al., "New Air Transport for Heavy Bulky Cargo" (Advanced Copy), Apr. 20, 1962 (35 pages).
W.L. Marcy, "Parametric Design Study of Fully-Buoyant Naval Air Vehicles", NADC, Nov. 30, 1976 (85 pages).
Stepier, Richard M., "Return to Lighter Than Air Transportation for Military and Civilian Application", Defense Systems Management School, Fort Belvoir, VA, Nov. 1973 (56 pages).
"Types of Ligher-Than-Air Aircraft," Author unknown, Publication date unknown (34 pages).
Mark D. Ardema, "Vehicle Concepts and Technology Requirements for Buoyant Heavy-Lift Systems", NASA, 1979 (36 pages).
Mark D. Ardema, "Vehicle Concepts and Technology Requirements for Bouyant Heavy-Lift Systems", NASA Technical Paper, 1981 (18 pages).
David Bailey and William Mueller, "North Warning Airship Program, Final Overview," Naval Air Development Center, Apr. 6, 1987 (223 pages).
"Preliminary Design Investigation for Payload and Ground Handling Concepts for Airships Operating in Remote Arctic Regions, Final Report," Naval Air Development Center, Mar. 31, 1986 (224 pages).
Capt. J. Arvi et al., "North Warning Program Airship Feasibility Tests, Final Report," Naval Air Development Center, Feb. 20, 1987 (41 pages).
Capt. J. Arvi et al., "North Warning System Familliarisation, Feasibility and Operational Demonstration, Final Report," Naval Air Development Center, Apr. 19, 1986 (126 pages).
Douglas Botting, "The Giant Airships," Time-Life Books, Alexandria, VA 1980 (186 pages).

E. Udartsev and E. Tyan, "Dirigible of a New Generation in Kiev", available at http://www.aviajournal.com/sections/journal/arh/magazine/200112/index.html. 2001 (9 pages).
Edwin Mowforth, "An Introduction to the Airship," Third Edition, The Airship Association, Sep. 2007 (158 pages).
PCT report of partial international search regarding PCT/US2007/021962, Dec. 2, 2008.
Construction Cost Management Co., "With Us, Future Comes Faster," available at http://www.buildcostcontrol.com/Airship/tabld/640/Default.aspx, (1 page).
*Future Flight?*. Leslie Deane, Ballooning, The Journal of the Balloon Federation of America, Jul./Aug. 2008, pp. 26-32.
PCT Communication Relating to the Results of the Partial International Search re PCT/US2008/009453, mailed Feb. 4, 2009.
Repoulias et al., "Dynamically Feasible Trajectory and Open-Loop Control Design for Unmanned Airships," 2007 Mediterranean Conference on Control and Automation, Jul. 27, 2007, XP002511581, Athens, Greece.
Nagabhushan et al., "Directional control of an advanced airship," AIAA Lighter-Than-Air Systems Technology Conference, 11th, Clearwater Beach, FL, May 15-18, 1995, Technical Papers (A95-30317 07-01), Washington, DC, American Institute of Aeronautics and Astronautics, May 15, 1995, pp. 107-116.
PCT International Search Report and Written Opinion re PCT/US2008/009453, mailed Apr. 3, 2009.
PCT International Search Report and Written Opinion re PCT/US2007/021962, mailed Apr. 3, 2009.
http://dynalifter.com/, accessed Dec. 1, 2009 (23 pages).
http://www.hybridairvehicles.net/index.html, accessed Dec. 1, 2009 (16 pages).
http://www.skylifter.com.au/, accessed Dec. 1, 2009 (17 pages).
Luffman, "Aeroraft the Alternative Aircraft for Heavy Lift Transport or Crane Use," American Institute of Aeronautics and Astronautics, AIAA's $3^{rd}$ Annual Aviation Technology, Integration, and Operations (ATIO) Tech, Nov. 17-19, 2003, Denver, Colorado, AIAA 2003-6754, pp. 1-13.
Ahmed Ghanmi and Abderrahmane Sokri, "Airships for military logistics heavy lift: A performance assessment for Northern operation applications," Defence R&D Canada—CORA, Technical Memorandum, Jan. 2010 (63 pages).
European Examination Report from EP Application No. 08 827 387.5-1254, Jun. 1, 2010. (4 pages).
European Examination Report from EP Application No. 07 673 610.1-2422, dated Aug. 16, 2010. (4 pages).
Office Action dated Sep. 3, 2009, from U.S. Appl. No. 11/907,883. (16 pages).
Final Office Action dated Apr. 1, 2010, from U.S. Appl. No. 11/907,883, (13 pages).
Advisory Action dated Aug. 3, 2010, from U.S. Appl. No. 11/907,883. (3 pages).
Amendment After Final dated Aug. 17, 2010, from U.S. Appl. No. 11/907,883. (28 pages).
Notice of Allowance dated Sep. 1, 2010, from U.S. Appl. No. 11/907,883. (4 pages).
L. Balls Crema et al., "Some Trends in Airship Technology Developments," NATO, Apr. 10-15, 1983 (14 pages).
International Search Report and the Written Opinion mailed on Oct. 8, 2012 in counterpart International Application No. PCT/US2012/030562, 24 pages.

\* cited by examiner

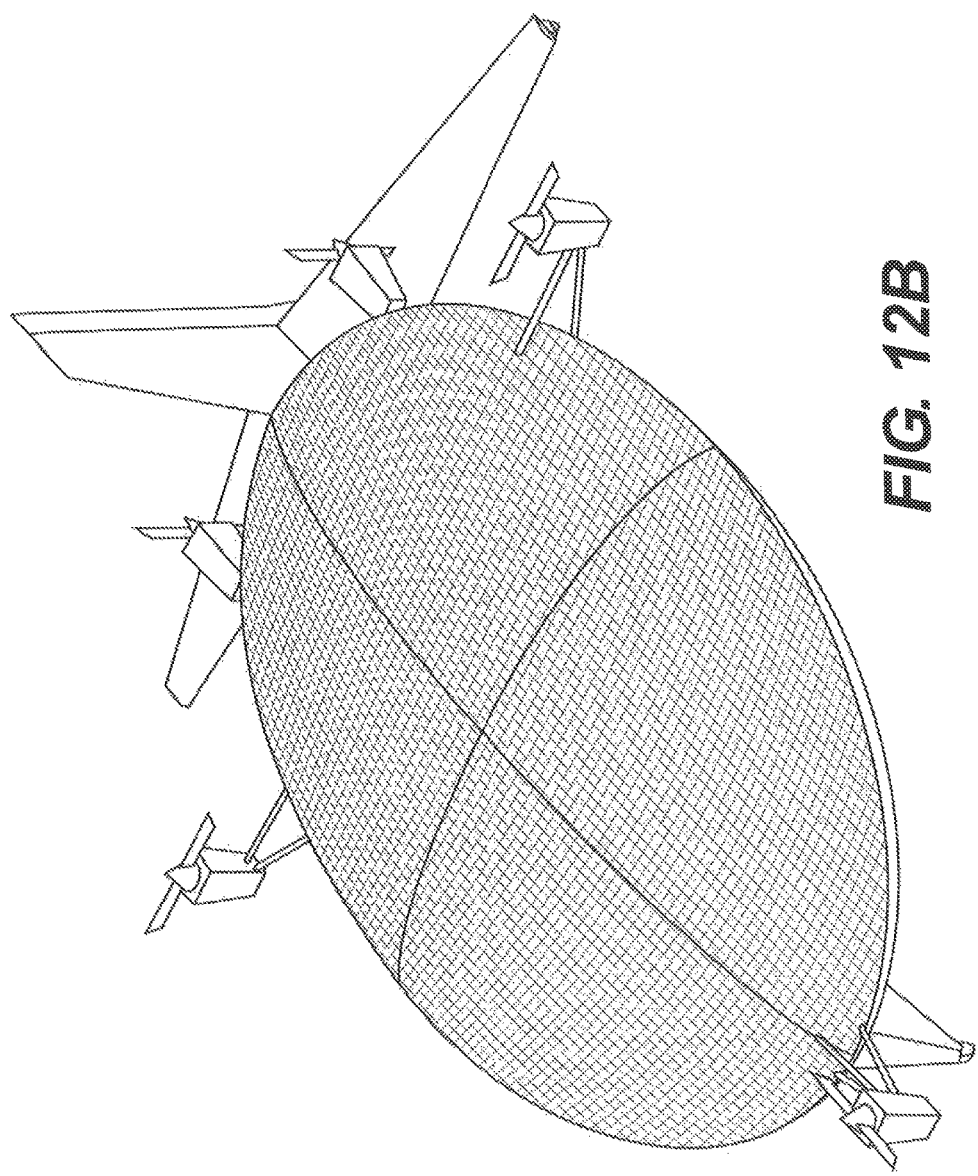

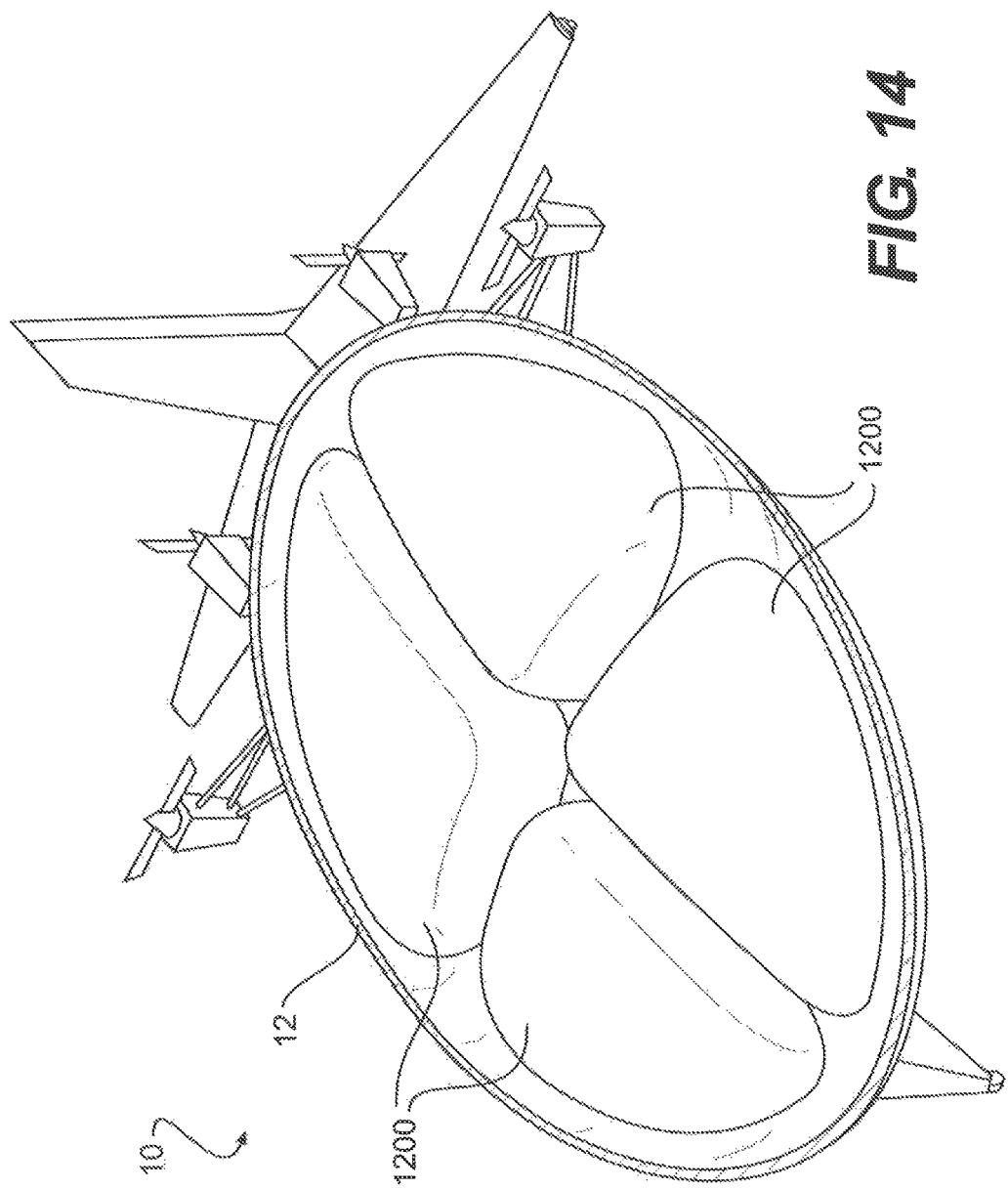

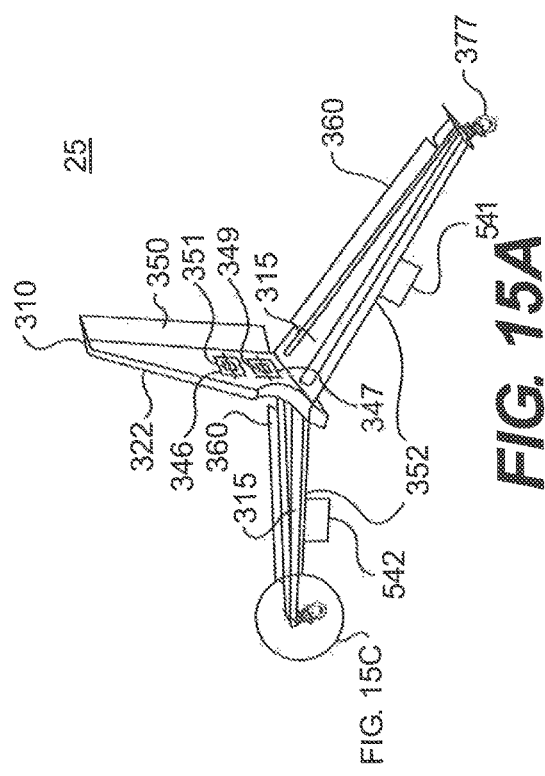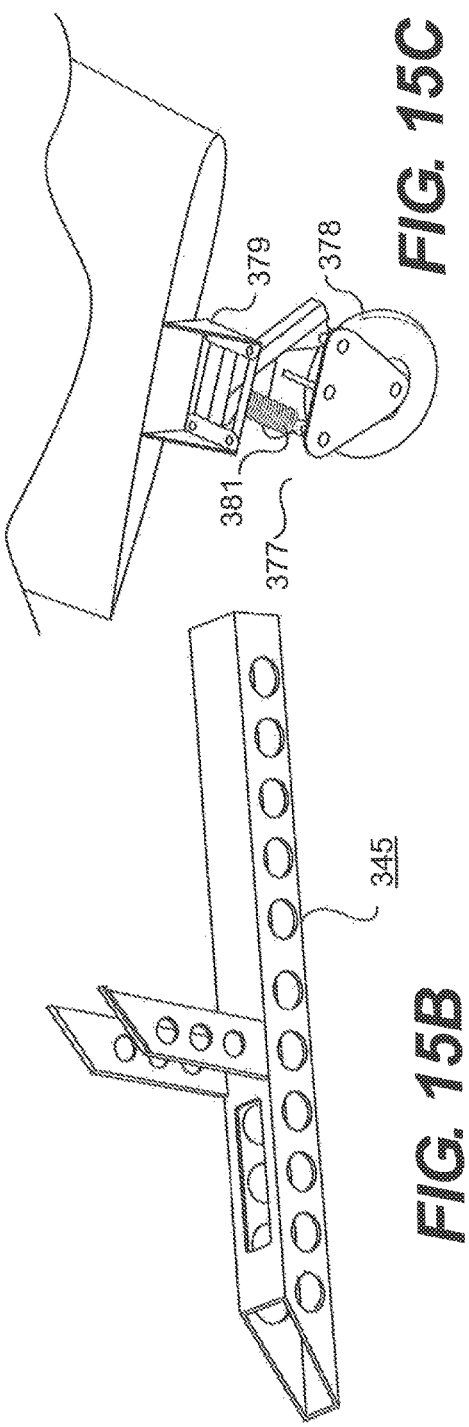

AIRSHIP INCLUDING AERODYNAMIC, FLOATATION, AND DEPLOYABLE STRUCTURES

PRIORITY

This is a divisional of U.S. patent application Ser. No. 14/058,410, filed Oct. 21, 2013, which is a divisional of U.S. application Ser. No. 13/430,010, filed on Mar. 26, 2012 (now U.S. Pat. No. 8,596,571), which claims the benefit of priority of U.S. Provisional Application No. 61/470,025 filed Mar. 31, 2011, entitled "AIRSHIP INCLUDING AERODYNAMIC, FLOATATION, AND DEPLOYABLE STRUCTURES," the entire content of all the above-referenced applications are incorporated herein by reference.

FIELD OF THE INVENTION

The present disclosure is directed to an airship and features therefor.

BACKGROUND

The present invention relates to an airship including aerodynamic, floatation, and deployable structures. Each of U.S. Pat. No. 7,866,601, issued Jan. 11, 2011, U.S. patent application Ser. No. 12/957,989 filed Dec. 1, 2010, U.S. patent application Ser. No. 12/222,355, filed Aug. 7, 2008, U.S. Pat. No. D583,294, issued Dec. 23, 2008, U.S. Design patent application Ser. No. 29/366,163, filed Jul. 20, 2010, and U.S. Provisional Patent Application No. 61/366,125, filed Jul. 20, 2010 discloses subject matter related to the present invention and the contents of these applications are incorporated herein by reference in their entirety.

Aerostatic lighter-than-air airships have seen substantial use since 1783 following the first successful manned flight of the Montgolfier brothers' hot air balloon. Numerous improvements have been made since that time, but the design and concept of manned hot air balloons remains substantially similar. Such designs may include a gondola for carrying a pilot and passengers, a heating device (e.g., a propane torch), and a large envelope or bag affixed to the gondola and configured to be filled with air. The pilot may then utilize the heating device to heat the air until the buoyant forces of the heated air exert sufficient force on the envelope to lift the balloon and an attached gondola. Navigation of such an airship has proven to be difficult, mainly due to wind currents and lack of propulsion units for directing the balloon.

To improve on the concept of lighter-than-air flight, some lighter-than-air airships have evolved to include propulsion units, navigational instruments, and flight controls. Such additions may enable a pilot of such an airship to direct the thrust of the propulsion units in such a direction as to cause the airship to proceed as desired. Airships utilizing propulsion units and navigational instruments typically do not use hot air as a lifting gas (although hot air may be used), with many pilots instead preferring lighter-than-air lifting gases such as hydrogen and helium. These airships may also include an envelope for retaining the lighter-than-air gas, a crew area, and a cargo area, among other things. The airships are typically streamlined in a blimp- or zeppelin-like shape, which, while providing reduced drag, may subject the airship to adverse aeronautic effects (e.g., weather cocking, a.k.a. wind cocking).

Airships other than traditional hot air balloons may be divided into several classes of construction: rigid, semi-rigid, non-rigid, and hybrid type. Rigid airships typically possess rigid frames containing multiple, non-pressurized gas cells or balloons to provide lift. Such airships generally do not depend on internal pressure of the gas cells to maintain their shape. Semi-rigid airships generally utilize some pressure within a gas envelope to maintain their shape, but may also have frames along a lower portion of the envelope for purposes of distributing suspension loads into the envelope and for allowing lower envelope pressures, among other things. Non-rigid airships typically utilize a pressure level in excess of the surrounding air pressure in order to retain their shape and any load associated with cargo carrying devices is supported by the gas envelope and associated fabric. The commonly used blimp is an example of a non-rigid airship.

Hybrid airships may incorporate elements from other airship types, such as a frame for supporting loads and an envelope utilizing pressure associated with a lifting gas to maintain its shape. Hybrid airships also may combine characteristics of heavier-than-air airship (e.g., airplanes and helicopters) and lighter-than-air technology to generate additional lift and stability. It should be noted that many airships, when fully loaded with cargo and fuel, may be heavier than air and thus may use their propulsion system and shape to generate aerodynamic lift necessary to stay aloft. However, in the case of a hybrid airship, the weight of the airship and cargo may be substantially compensated for by lift generated by forces associated with a lifting gas such as, for example, helium. These forces may be exerted on the envelope, while supplementary lift may result from aerodynamic lift forces associated with the hull.

A lift force (i.e., buoyancy) associated with a lighter-than-air gas may depend on numerous factors, including ambient pressure and temperature, among other things. For example, at sea level, approximately one cubic meter of helium may balance approximately a mass of one kilogram. Therefore, an airship may include a correspondingly large envelope with which to maintain sufficient lifting gas to lift the mass of the airship. Airships configured for lifting heavy cargo may utilize an envelope sized as desired for the load to be lifted.

Hull design and streamlining of airships may provide additional lift once the airship is underway, however, previously designed streamlined airships, in particular, may experience adverse effects based on aerodynamic forces because of such hull designs. For example, one such force may be weather cocking, which may be caused by ambient winds acting on various surfaces of the airship. The term "weather cocking" is derived from the action of a weather vane, which pivots about a vertical axis and always aligns itself with wind direction. Weather cocking may be an undesirable effect that may cause airships to experience significant heading changes based on a velocity associated with the wind. Such an effect may thereby result in lower ground speeds and additional energy consumption for travel. Lighter-than-air airships may be particularly susceptible to weather cocking and, therefore, it ray be desirable to design a lighter-than-air airship to minimize the effect of such forces.

On the other hand, airships having a hull shape with a length that is similar to the width may exhibit reduced stability, particularly at faster speeds. Accordingly, the aspect ratio of length to width (length:width) of an airship may be selected according to the intended use of the airship.

Landing and securing a lighter-than-air airship may also present unique problems based on susceptibility to adverse aerodynamic forces. Although many lighter than-air airships may perform "vertical take off and landing" (VTOL) maneuvers, once such an airship reaches a point near the ground, a final landing phase may entail ready access to a ground crew (e.g., several people) and/or a docking apparatus for tying or otherwise securing the airship to the ground. Without access to such elements, the airship may be carried away by wind currents or other uncontrollable forces while a pilot of the airship attempts to exit and handle the final landing phase. Therefore, systems and methods enabling landing and securing of an airship by one or more pilots may be desirable.

In addition, airships may include passenger and/or cargo compartments, typically suspended below the hull of the airship. However, such placement of a passenger/cargo compartment can have an adverse affect on aerodynamics and, consequently, performance capabilities of the airship. For example, an externally-mounted compartment increases drag in both fore-aft and port-starboard directions, thus requiring more power to propel the airship, and rendering the airship more sensitive to cross-winds. Further, because an externally-mounted compartment is typically on the bottom of the airship, the compartment is offset from the vertical center of the airship and, therefore, may lead to instability as the added drag due to the compartment comes in the form of forces applied substantially tangential to the outer hull of the airship, causing moments that tend to twist and/or turn the airship undesirably. Such adverse moments require stabilizing measures to be taken, typically in the form of propulsion devices and/or stabilizing members (e.g., wings). However, propulsion devices require power, and stabilizing members, while providing stability in one direction, may cause instability in another direction. For example, a vertically oriented stabilizer can provide lateral stability but may causes increased fore-aft drag, and may also render the airship more susceptible to cross winds. It would be advantageous to have an airship with a configuration that can carry passengers/cargo but does not cause the adverse affects typically associated with externally-mounted compartments and/or stabilizers mentioned above.

In addition, it may be desirable to be able to land an airship on water. However, externally mounted pontoons may exhibit excess drag, possibly causing instability. Accordingly it would be advantageous to have an airship with floatation structures that do not cause such excess drag.

Further, it may be desirable to be able to deploy various types of industrial apparatus from an airship. However, as noted above, any externally mounted apparatus may cause excess drag, and thus, instability. Therefore, it would be advantageous to have an airship with deployable apparatuses that do not cause excess drag as such.

The present disclosure is directed to addressing one or more of the desires discussed above utilizing various exemplary embodiments of an airship.

SUMMARY

In one exemplary aspect, the present disclosure is directed to an airship. The airship includes a hull configured to contain a gas, at least one propulsion assembly coupled to the hull and including a propulsion device, and at least one aerodynamic component including a plurality of fairing structures including one or more slats, wherein the at least one aerodynamic component is associated with the hull and is configured to direct airflow around the airship.

In another exemplary aspect, the present disclosure is directed to an airship. The airship includes a hull configured to contain a gas, at least one propulsion assembly coupled to the hull and including a propulsion device, and at least one floatation structure configured to support the airship during a water landing.

In a further exemplary aspect, the present disclosure is directed to an airship. The airship includes a hull configured to contain a gas, at least one propulsion assembly coupled to the hull and including a propulsion device, and at least one deployable apparatus housed within the hull and deployable from the hull for operation unrelated to the flight control or landing of the airship.

BRIEF DESCRIPTION OF THE DRAWING

FIG. 12B illustrates an exemplary disclosed airship embodiment having an exemplary embodiment of a solar energy converting device;

FIG. 14 illustrates a cutaway view of an exemplary airship embodiment showing a plurality of internal bladders;

FIGS. 15A-15D illustrate exemplary features of an empennage assembly;

DETAILED DESCRIPTION OF THE INVENTION

Reference will now be made in detail to the drawings. Wherever possible, the same reference numbers will be used throughout the drawings to refer to the same or like parts.

Figure 1:
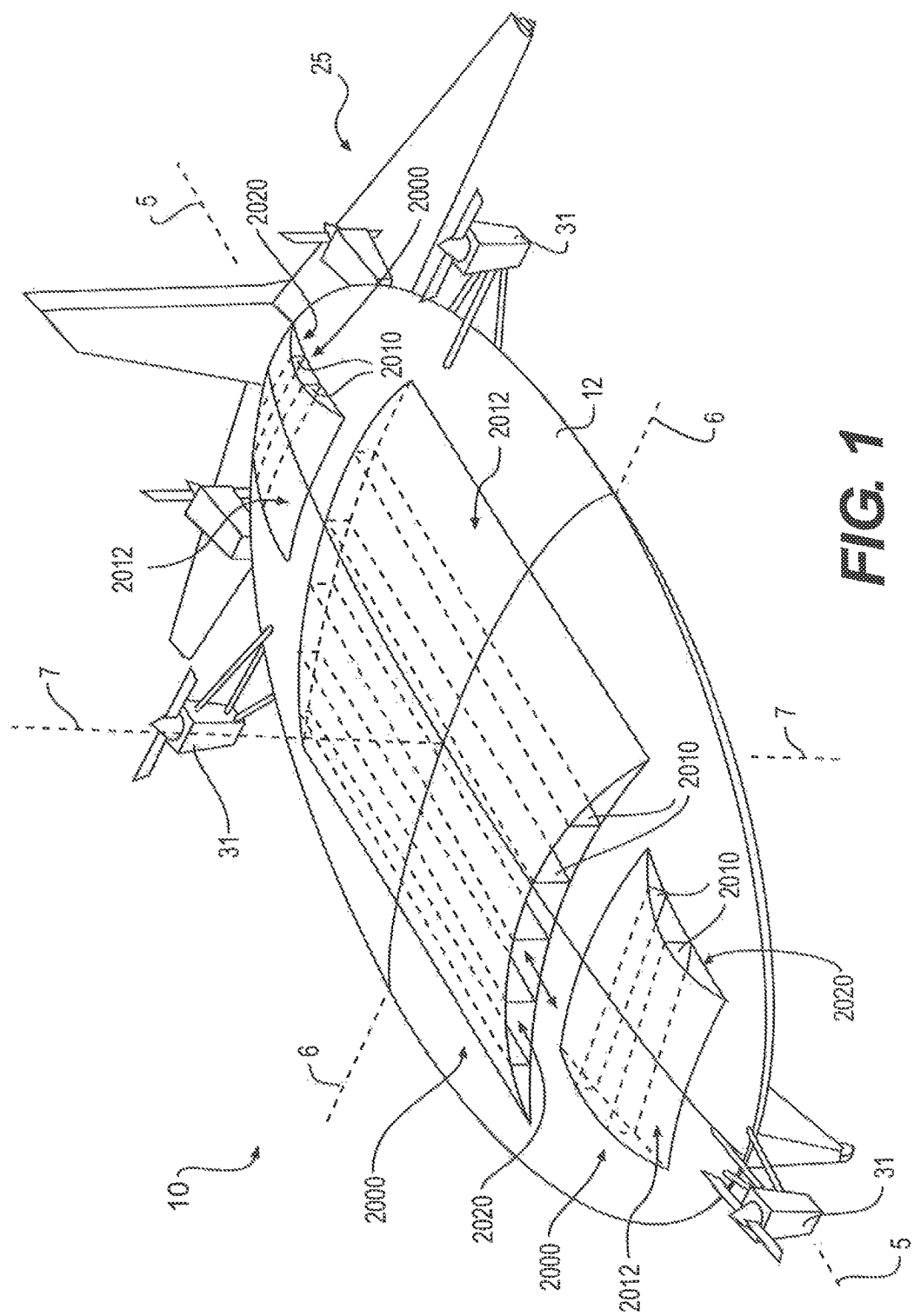
FIG. 1 illustrates an airship including aerodynamic components according to an exemplary disclosed embodiment.

The accompanying figures depict exemplary embodiments of an airship 10. Airship 10 may be configured for VTOL as well as navigation in three dimensions (e.g., X, Y, and Z planes). As shown in FIG. 1, for example, airship 10 may include a hull 12 configured to contain a gas. Airship 10 may also include an empennage assembly 25 coupled to airship 10, at least one propulsion assembly 31 coupled to airship 10, a power supply system 1000 for delivering power to propulsion assembly 31 (see FIG. 12A), and a cargo system 1100 for carrying passengers and/or freight (see, e.g., FIGS. 13A and 13B). Alternatively, or additionally, in some embodiments airship 10 may include one or more aerodynamic components 2000 (see, e.g., FIG. 1), and one or more floatation structures 4000 (see, e.g., FIG. 25). Further, in some embodiments, airship 10 may include a deployable apparatus 5000 (see, e.g., FIG. 29).

Throughout this discussion of various embodiments, the terms "front" and/or "fore" will be used to refer to areas within a section of airship 10 closest to forward travel, and the term "rear" and/or "aft" will be used to refer to areas within a section of airship 10 closest to the opposite direction of travel. Moreover, the term "tail" will be used to refer to a rear-most point associated with hull 12, while the term "nose" will be used to refer to the forward-most point within the front section of hull 12.

The accompanying figures illustrate various axes relative to the exemplary airship 10 for reference purposes. For example, as shown in FIG. 1, airship 10 may include a roll axis 5, a pitch axis 6, and a yaw axis 7. Roll axis 5 of airship 10 may correspond with an imaginary line running through hull 12 in a direction from, for example, the tail to the nose of airship 10. Yaw axis 7 of airship 10 may be a central, vertical axis corresponding with an imaginary line running perpendicular to roll axis 5 through hull 12 in a direction from, for example, a bottom surface of hull 12 to a top surface of hull 12. Pitch axis 6 may correspond to an imaginary line running perpendicular to both yaw and roll axes, such that pitch axis 6 runs through hull 12 from one side of airship 10 to the other side of airship 10, as shown in FIG. 1. "Roll axis" and "X axis" or "longitudinal axis"; "pitch axis" and "Y axis;" and "yaw axis" and "Z axis" may be used interchangeably throughout this discussion to refer to the various axes associated with airship 10. One of ordinary skill in the art will recognize that the terms described in this paragraph are exemplary only and not intended to be limiting.

Hull

Figure 2:
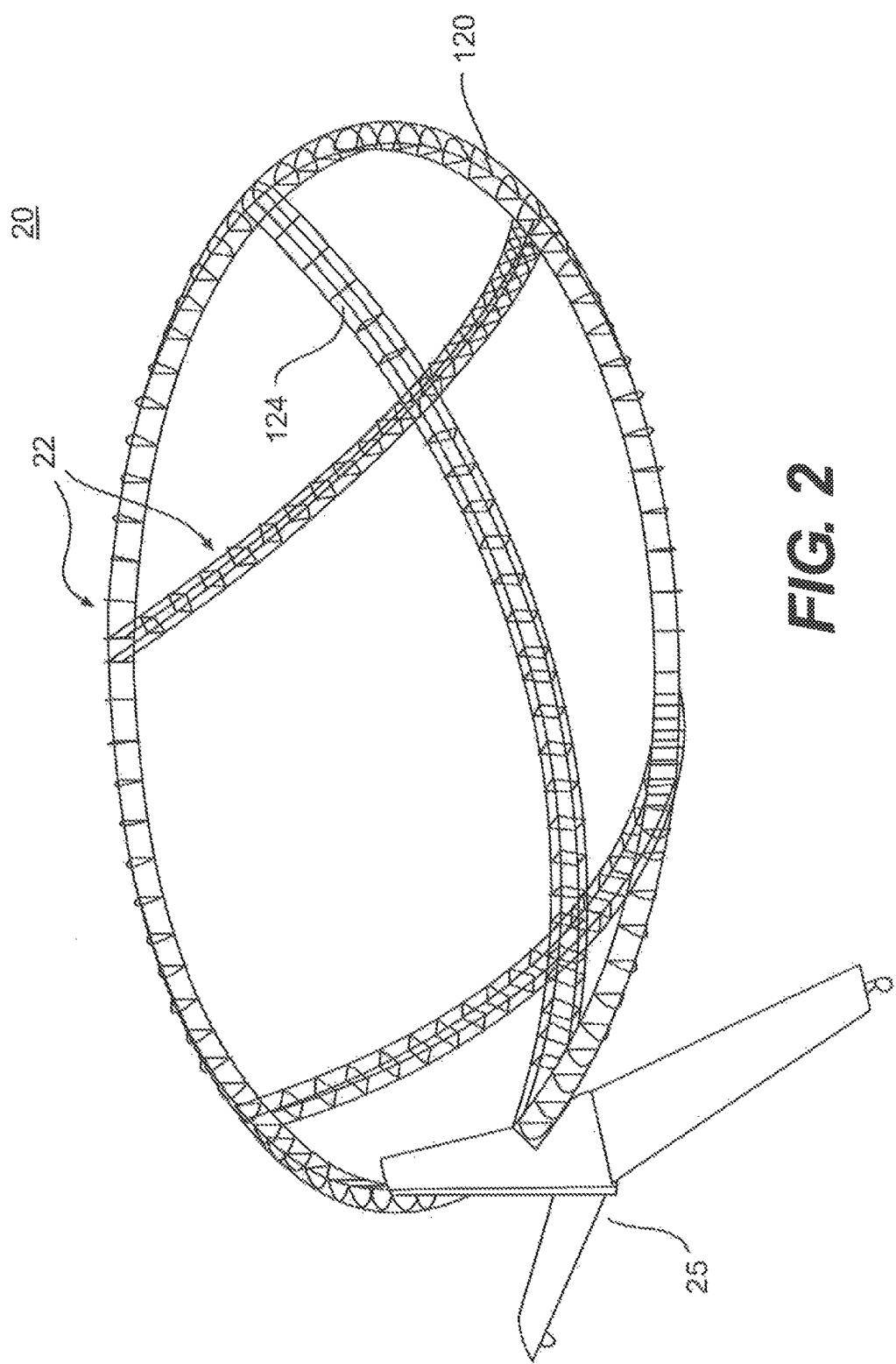
FIG. 2 illustrates an exemplary support structure of the disclosed airship.
Figure 3:
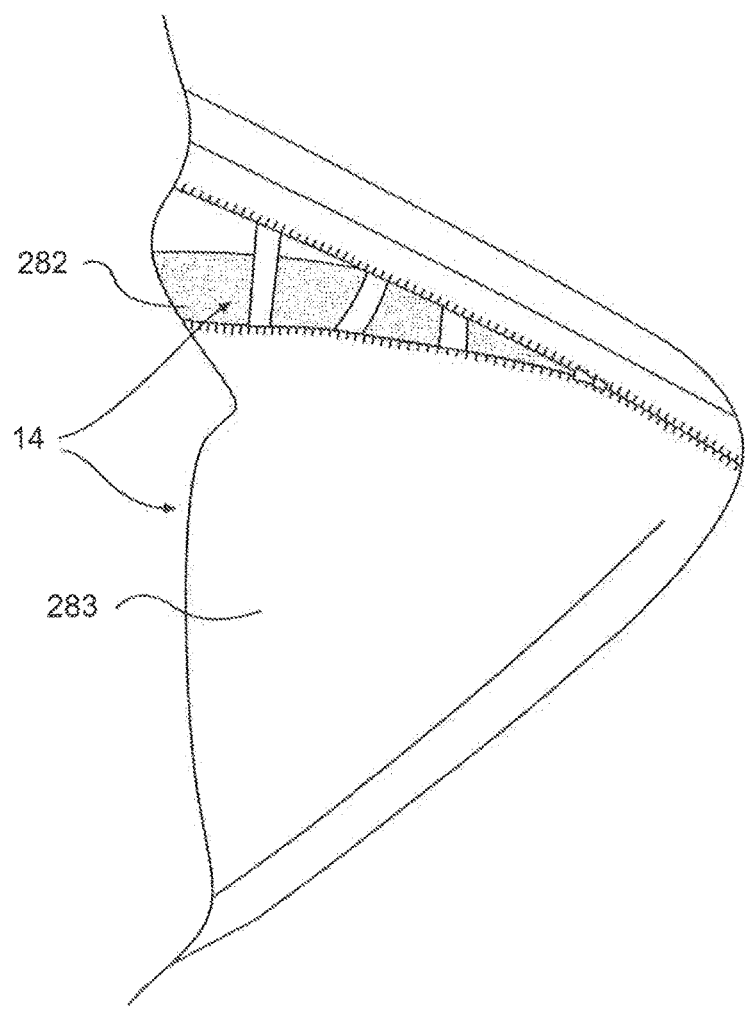
FIG. 3 illustrates an exemplary disclosed hull material of the disclosed airship.

Hull 12 may include a support structure 20 (see FIG. 2), and one or more layers of material 14 substantially covering support structure 20 (see FIG. 3). In some embodiments, airship 10 may be a "rigid" airship. As used herein, the term "rigid airship" shall refer to an airship having a rigid framework, and containing one or more non-pressurized gas cells or bladders to provide lift, wherein the hull of the airship does not depend on internal pressure of the gas cells to maintain its shape.

FIG. 2 illustrates an exemplary support structure 20 according to some embodiments of the present disclosure. For example, support structure 20 may be configured to define a shape associated with airship 10, while providing support to numerous systems associated with airship 10. Such systems may include, for example, hull 12, propulsion assemblies 31, power supply system 1000, and/or cargo system 1100. As shown in FIG. 2, support structure 20 may be defined by one or more frame members 22 interconnected to form a desired shape. For example, airship 10 may include a substantially circular, oval, elliptical, or otherwise oblong, peripheral beam (e.g., a keel hoop 120). Keel hoop 120 may include one or more frame sections with a defined radius of curvature that may be affixed to one another to form keel hoop 120 of a desired radius or oblong shape and size. In some embodiments, keel hoop 120 may have a diameter of, for example, approximately 21 meters. In oblong embodiments, keel hoop 120 may be similarly sized. Support structure 20 may also include a longitudinal frame member 124 configured to extend in a longitudinal direction from a fore portion of keel hoop 120 to a rear portion of keel hoop 120.

To maximize a lifting capacity associated with airship 10, it may be desirable to design and fabricate support structure 20 such that weight associated with support structure 20 is minimized while strength, and therefore resistance to aerodynamic forces, for example, is maximized. In other words, maximizing a strength-to-weight ratio associated with support structure 20 may provide a more desirable configuration for airship 10. For example, one or more of frame members 22 may be constructed from light weight, but high strength, materials including, for example, a substantially carbon-based material (e.g., carbon fiber) and/or aluminum, among other things.

Hull 12 may be configured to retain a volume of lighter-than-air gas. In some embodiments, hull 12 may include at least one envelope 282 sewn or otherwise assembled of fabric or material configured to retain a lighter-than-air gas, as shown in FIG. 3. Envelope 282 may be fabricated from materials including, for example, aluminized plastic, polyurethane, polyester, laminated latex, mylar, and/or any other material suitable for retaining a lighter-than-air gas.

Lighter-than-air lifting gasses for use within envelope 282 of hull 12 may include, for example, helium, hydrogen, methane, and ammonia, among others. The lift force potential of a lighter-than-air gas may depend on the density of the gas relative to the density of the surrounding air or other fluid (e.g., water). For example, the density of helium at 0 degrees Celsius and 101.325 kilo-Pascals may be approximately 0.1786 grams/liter, while the density of air at 0 degrees C. and 101.325 kilo-Pascals may be approximately 1.29 g/L. Neglecting the weight of a retaining envelope, equation (1) below illustrates a simplified formula for calculating a buoyant force, Fbuoyant, based on volume of a lighter-than-air gas, where Df is a density associated with an ambient fluid, Dlta is a density associated with the lighter-than-air gas, gc is the gravity constant, and V is the volume of the lighter-than-air gas.

$$F\text{buoyant}=(Df-Dlta)*gc*V \quad (1)$$

Simplifying the equation based on a volume of helium suspended within air at 0 degrees C. and 101.325 kilo-Pascals, a buoyant force may be determined to be approximately Fbouyant/gc=1.11 grams per liter (i.e., approximately 1 kg per cubic meter of helium). Therefore, based on the lighter-than-air gas chosen, an internal volume of first envelope 282 associated with hull 12 may be selected such that a desired amount of lift force is generated by a volume of lighter-than-air gas. Equation (2) below may be utilized to calculate such a desired volume for aerostatic lift, taking into account the mass, M, of airship 10.

$$V>M/(Df-Dlta) \quad (2)$$

In addition, in some embodiments, hull 12 may be formed of a self-sealing material. One or more layers of hull 12 may be selected from known self-sealing materials, e.g., a viscous substance.

Hull 12 of airship 10 may have a three-dimensional shape that is selected according to intended functionality and use of the airship. Factors that may be considered in selecting an airship shape may include the size, weight, and/or placement of the intended payload, speed of travel, range, longevity, maneuverability, etc. According to these and other factors, a number of design variables, many having an influence on hull shape, may be considered and balanced in arriving at a hull shape. Such variables may include, for example, volume/capacity of lighter than air gas, drag coefficient (including frontal, side, and vertical drag), weight, stability, etc.

Figure 4:
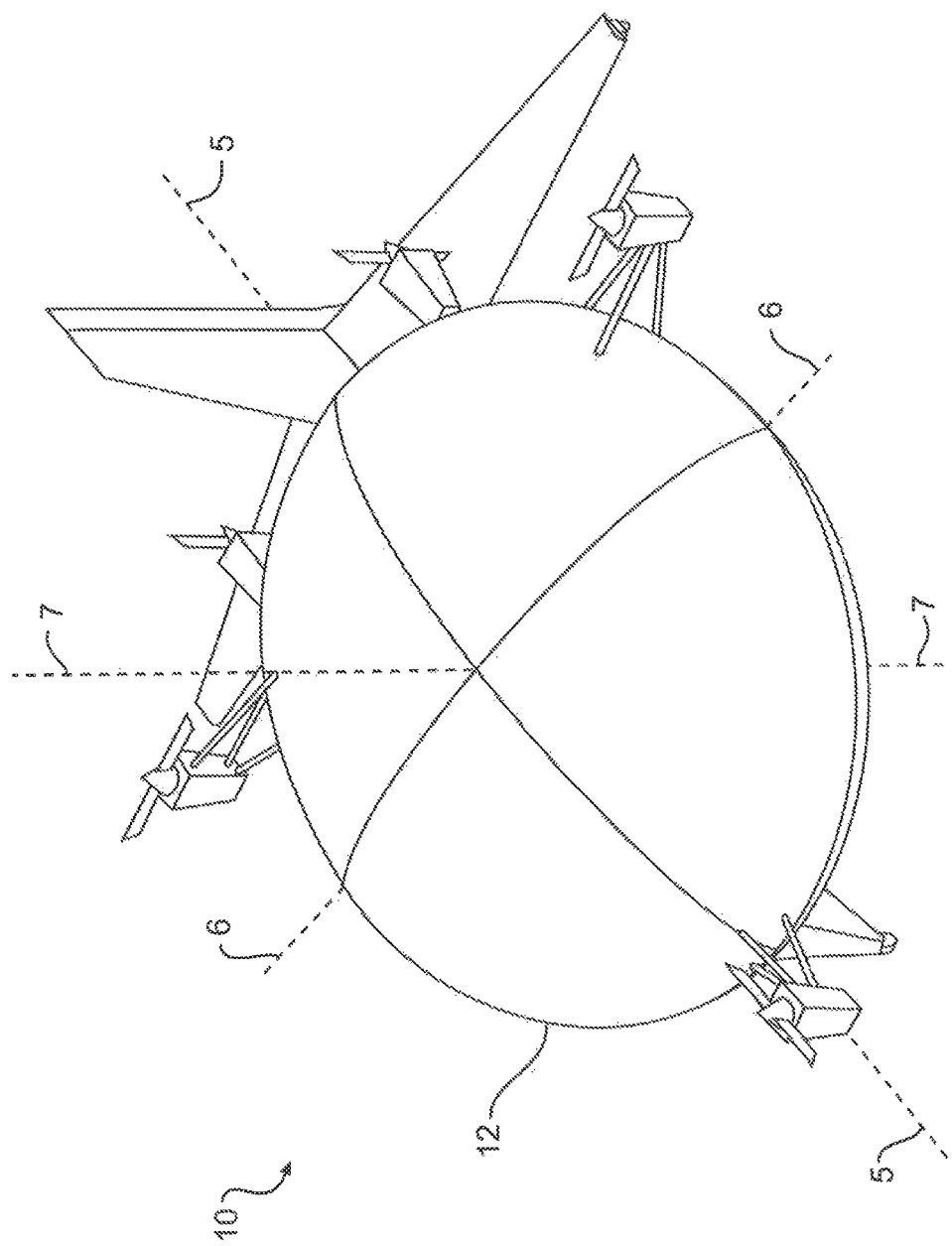
FIG. 4 illustrates an exemplary embodiment of the disclosed airship having a substantially oblate spheroid shape, wherein the aspect ratio between the hull length to the hull width is 1 to 1 (1:1)

In some embodiments, hull 12 of airship 10 may be "lenticular" in shape, i.e., substantially an oblate spheroid having a length, a width, and a height, wherein the length and the width have approximately the same dimension. (See FIG. 4.) For example, the dimensions of an oblate spheroid shape may be approximately described by the representation A=B>C, where A is a length dimension (e.g., along roll axis 5); B is a width dimension (e.g., along pitch axis 6); and C is a height dimension (e.g., along yaw axis 7) of an object. In other words, an oblate spheroid may have an apparently circular planform with a height (e.g., a polar diameter) less than the diameter of the circular planform (e.g., an equatorial diameter). For example, according to some embodiments, hull 12 may include dimensions as follows: A=21 meters; B=21 meters; and C=7 meters.

Figure 5:
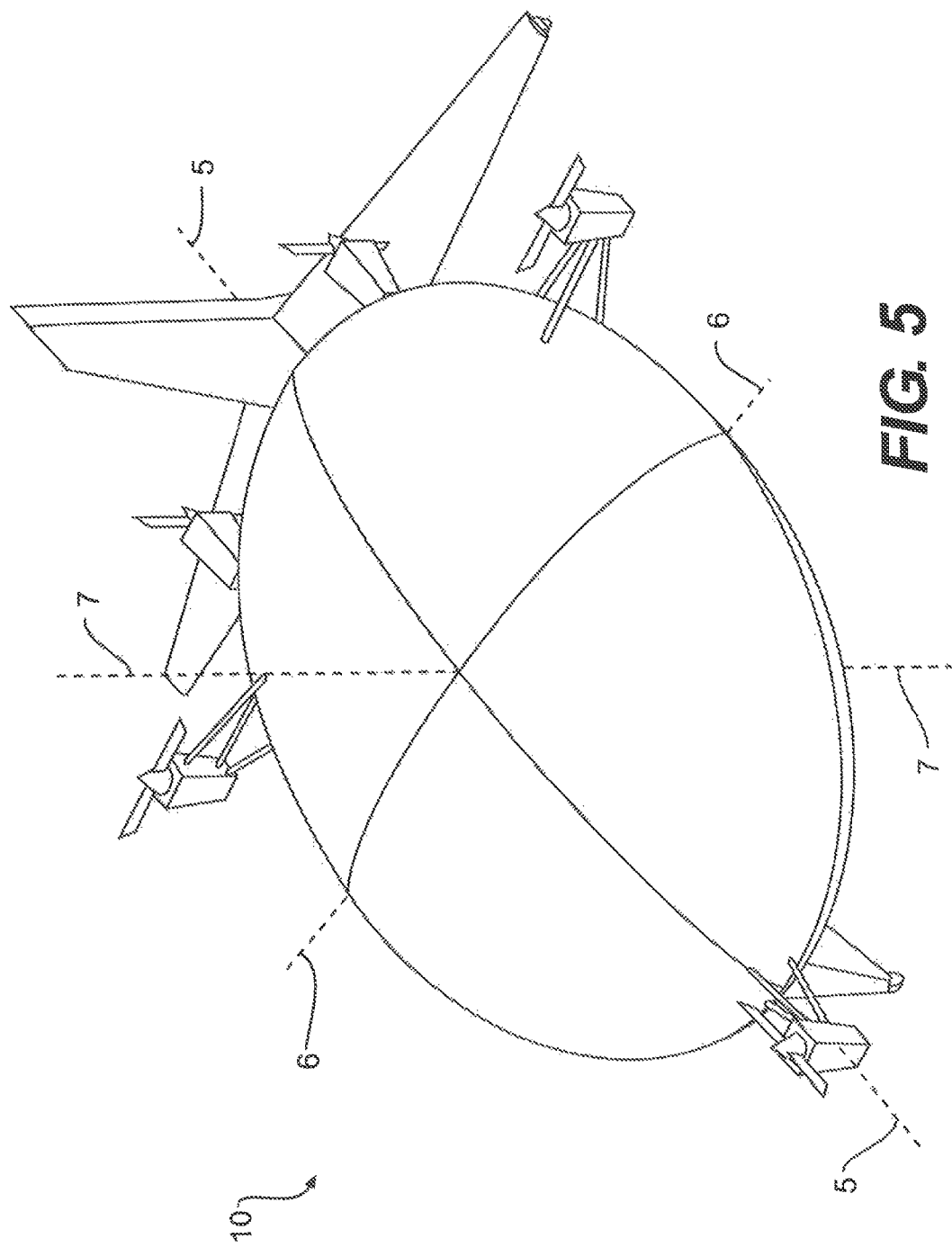
FIG. 5 illustrates an exemplary embodiment of the disclosed airship having a substantially oblate spheroid shape, wherein the aspect ratio between the hull length to the hull width is 4:3.
Figure 6:
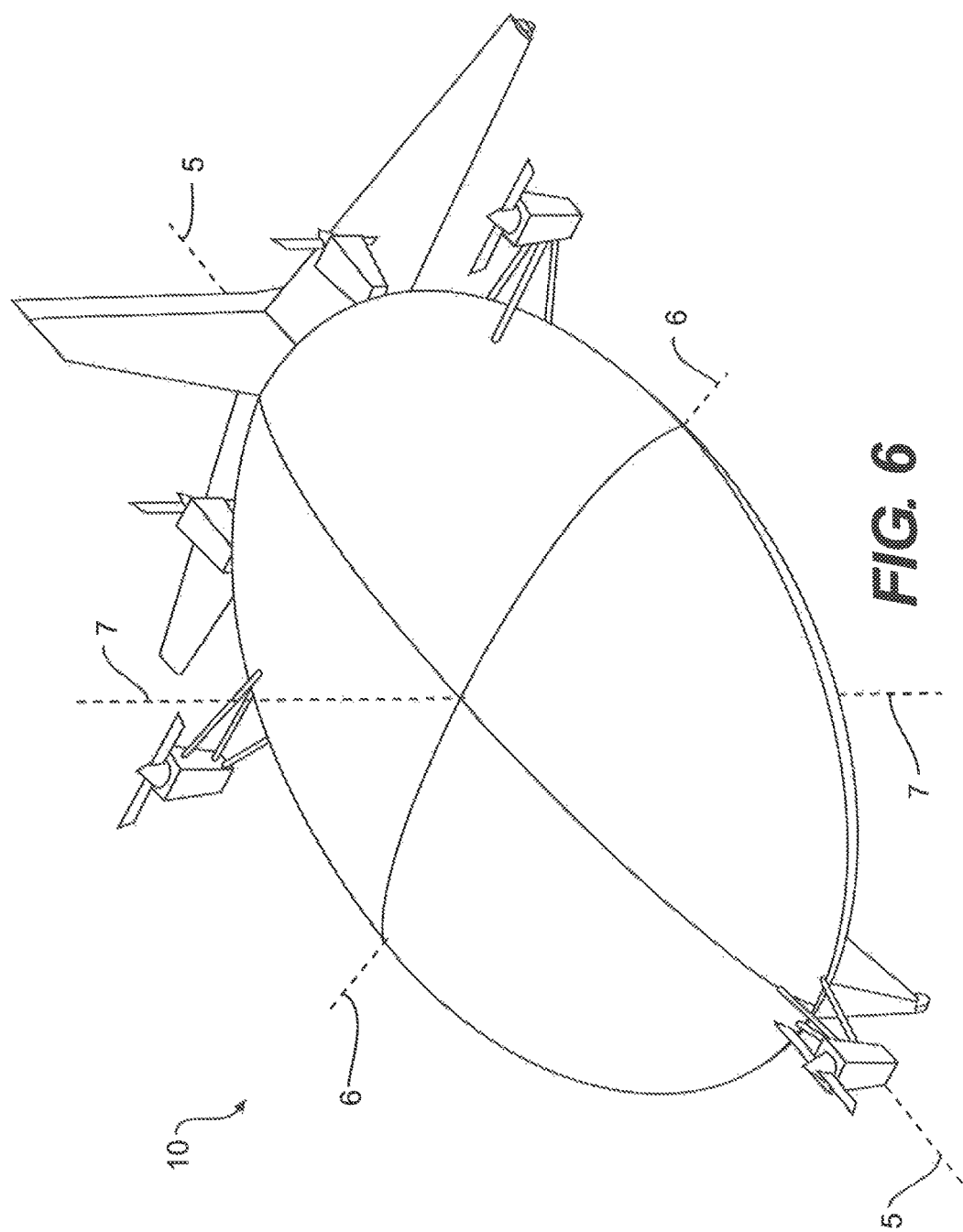
FIG. 6 illustrates an exemplary embodiment of the disclosed airship having a substantially oblate spheroid shape, wherein the aspect ratio between the hull length to the hull width is 3:2.
Figure 7:
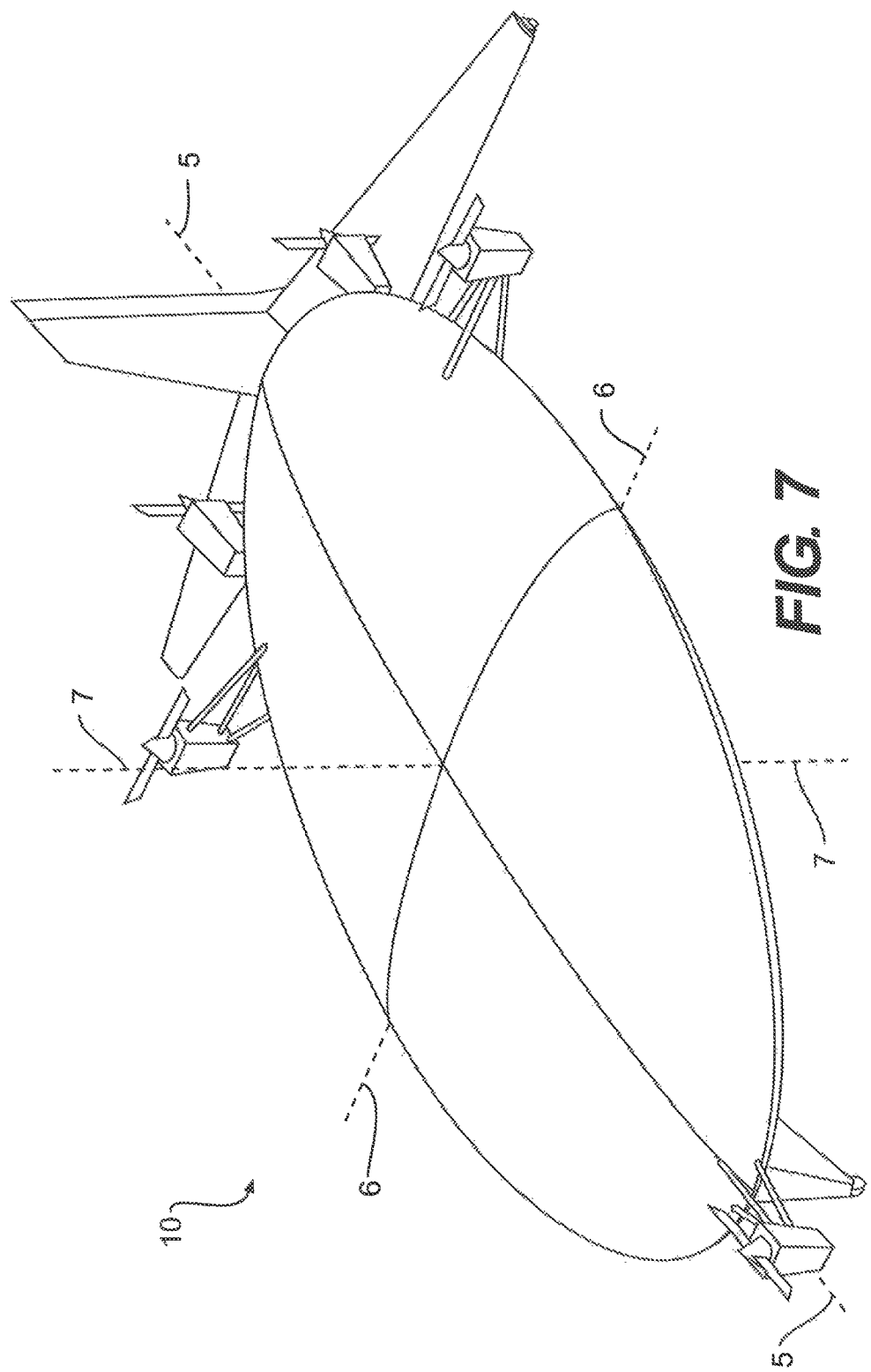
FIG. 7 illustrates an exemplary embodiment of the disclosed airship having a substantially oblate spheroid shape, wherein the aspect ratio between the hull length to the hull width is 2:1.

In other embodiments, hull 12 of airship 10 may be substantially oblong. That is, hull 12 may have a length, a width, and a height, wherein an aspect ratio between the length and the width is greater than 1 to 1 (1:1). For example, in some embodiments the aspect ratio of hull length to hull width may be between approximately 4:3 and 2:1. Particularly, in some embodiments, the aspect ratio may be approximately 4:3, as shown in FIG. 5. In other embodiments, the aspect ratio may be approximately 3:2, as shown in FIG. 6. In still other embodiments, the aspect ratio may be approximately 2:1, as shown in FIG. 7.

In addition to aerostatic lift generated by retention of a lighter-than-air gas, hull 12 may be configured to generate at least some aerodynamic lift when placed in an airflow (e.g., airship 10 in motion and/or wind moving around hull 12) based on the aerodynamic shape of hull 12 and/or on an associated angle of attack and airflow velocity relative to airship 10.

Figure 8:
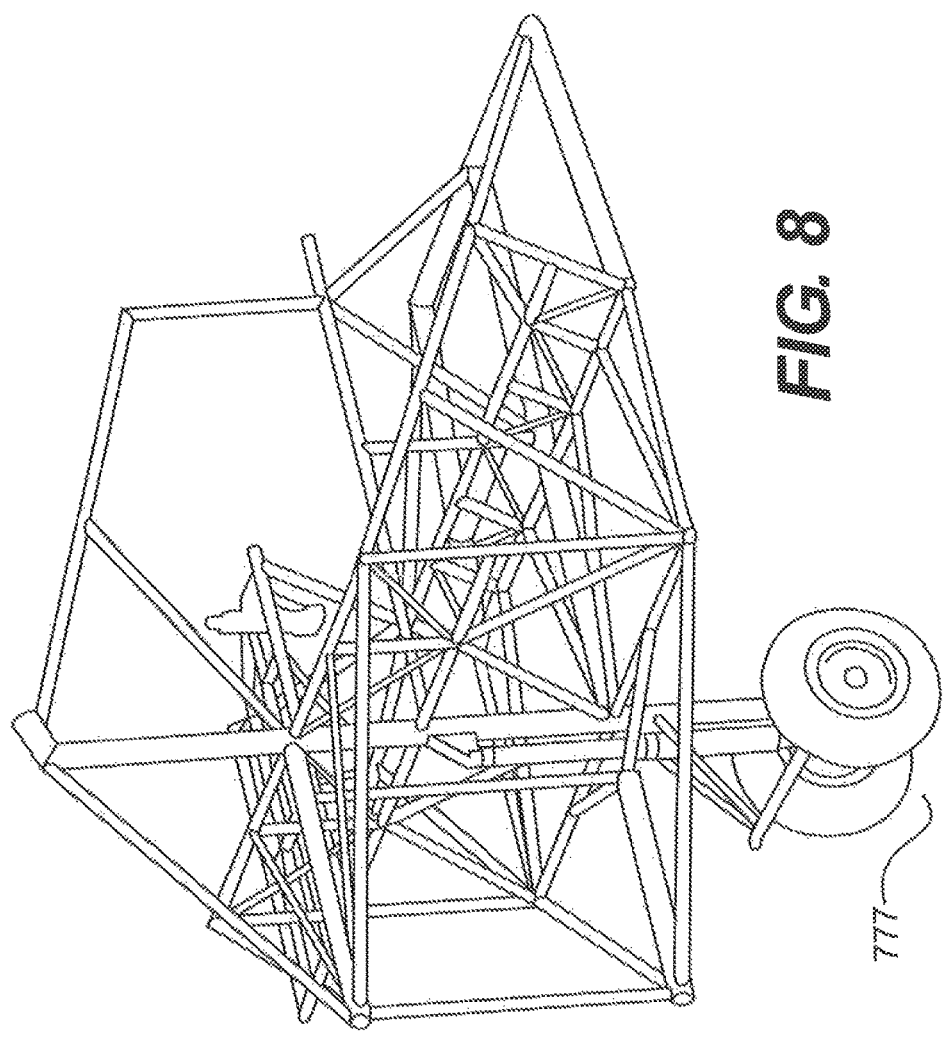
FIG. 8 illustrates an exemplary cockpit support structure and front landing gear assembly.

As shown in FIG. 8, support structure 20 may include one or more frame members comprising a chassis 705. In some embodiments, chassis 705 may be part of cargo system 1100, e.g., as part of a cockpit. In other embodiments, chassis 705 may be integrated with hull 12 independent of cargo system 1100. Chassis 705 may include high strength-to-weight ratio materials including, for example, aluminum and/or carbon fiber. In some embodiments, the one or more frame members of chassis 705 may be constructed as substantially tubular and may include a carbon fiber/resin composite and honeycomb-carbon sandwich. The honeycomb-carbon sandwich may include a carbon mousse or foam-type material. In such embodiments, individual frame members may be fabricated in an appropriate size and shape for assembly of chassis 705. Such construction may lead to a suitable strength-to-weight ratio for chassis 705 as desired for a particular purpose of airship 10. One of skill in the art will recognize that chassis 705 may be constructed in numerous configurations without departing from the scope of the present disclosure. The configuration of chassis 705 shown in FIG. 8 is merely exemplary.

Propulsion Assemblies

Figure 9:
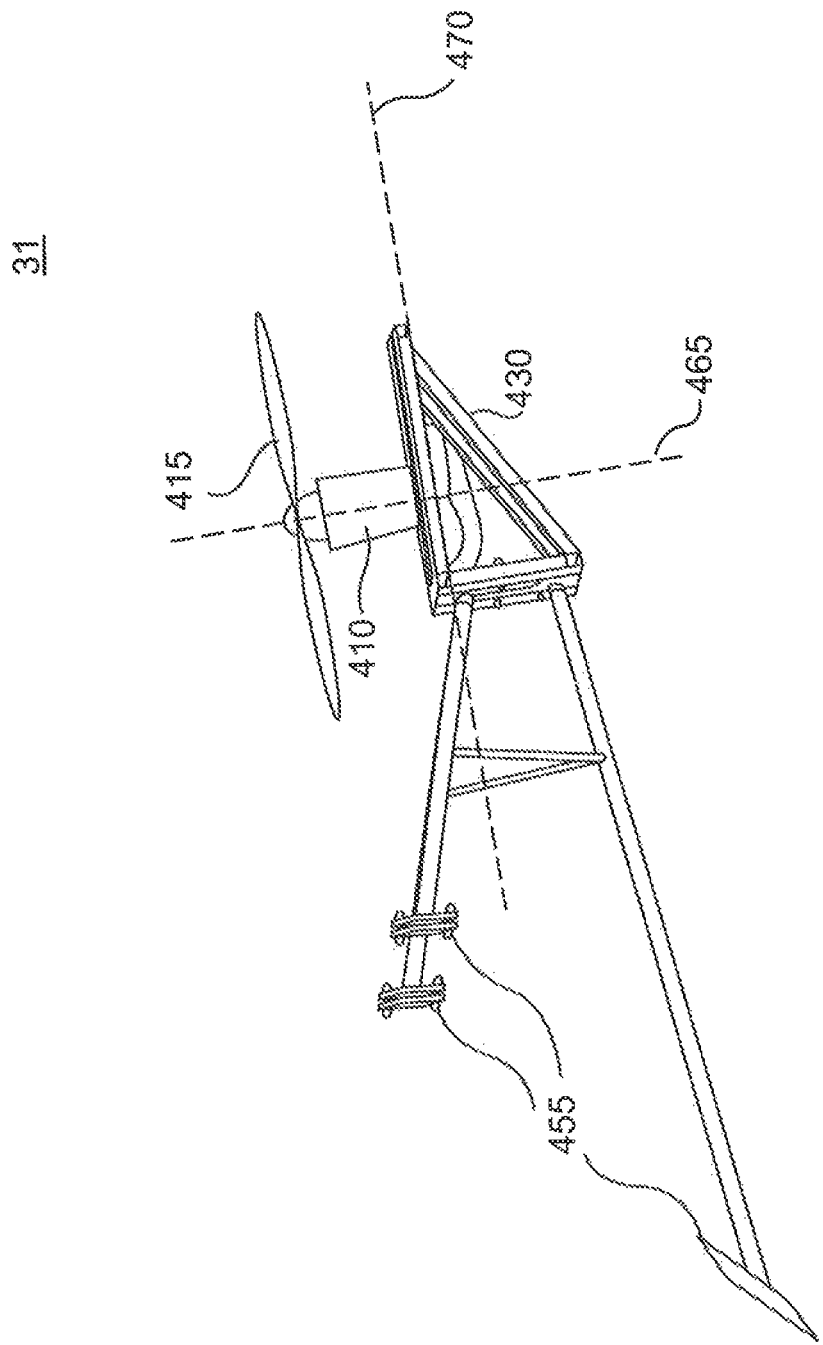
FIG. 9 illustrates an exemplary propulsion assembly and mounting assembly.
Figure 30:
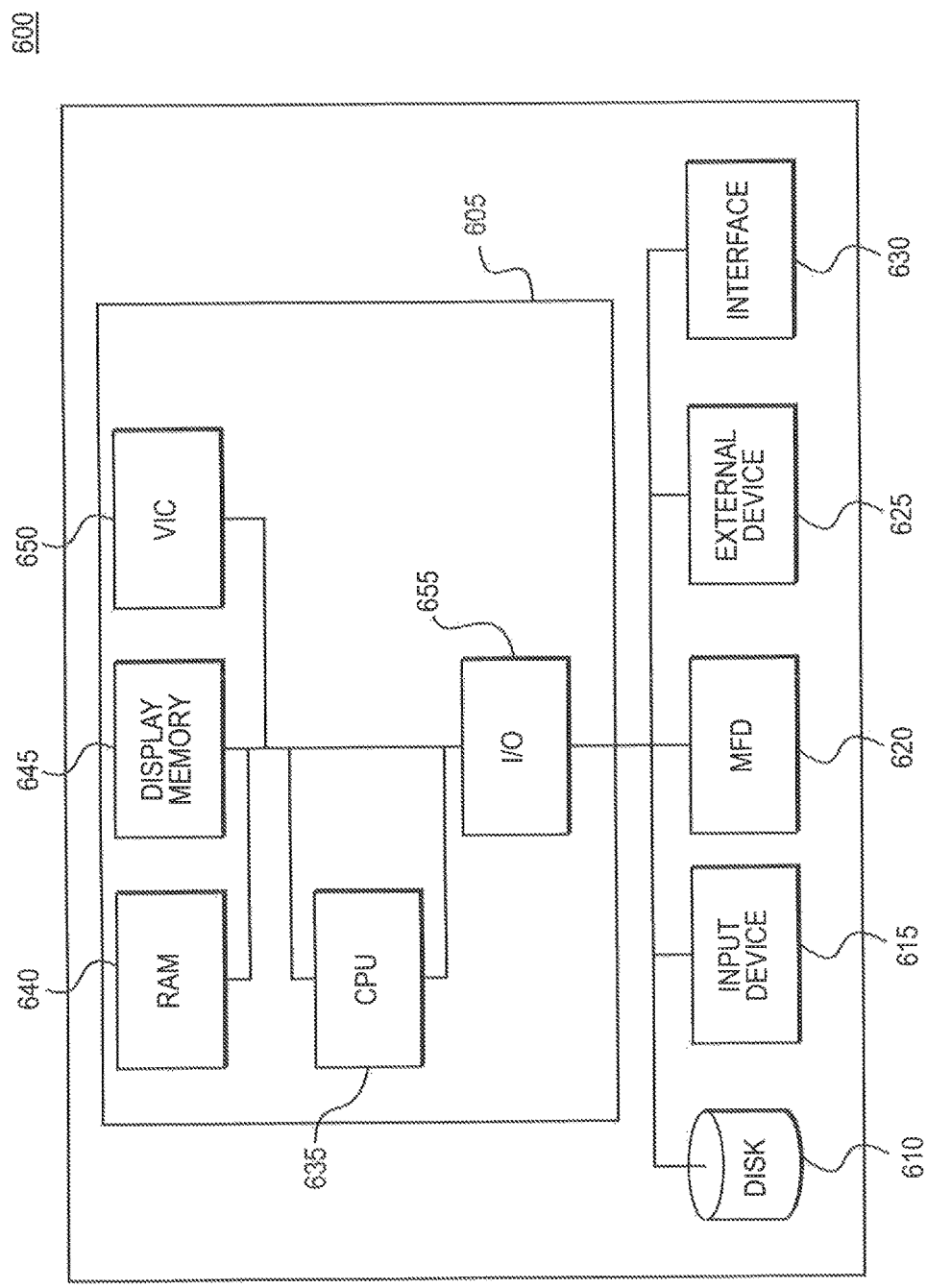
FIG. 30 is a block diagram of an exemplary embodiment of a computer configured to control various aspects of the disclosed airship.

FIG. 9 illustrates an exemplary embodiment of propulsion assemblies 31. For example, as shown in FIG. 9, propulsion assemblies 31 may include a power source 410, a propulsion device (such as power conversion unit 415), and a propulsion unit mount 430. Power source 410 may be operatively coupled to and configured to drive power conversion unit 415. Power source 410 may include, for example, electric motors, liquid fuel motors, gas turbine engines, and/or any suitable power source configured to generate rotational power. Power source 410 may further include variable-speed and/or reversible type motors that may be run in either direction (e.g., rotated clockwise or counterclockwise) and/or at varying rotational speeds based on control signals (e.g., signals from computer 600 (e.g., as shown in FIG. 30)). Power source 410 may be powered by batteries, solar energy, gasoline, diesel fuel, natural gas, methane, and/or any other suitable fuel source.

As shown in FIG. 9, each propulsion assembly 31 may include a power conversion unit 415 configured to convert the rotational energy of power source 410 into a thrust force suitable for acting on airship 10. For example, power conversion unit 415 may include a propulsion device, such as an airfoil or other device that, when rotated, may generate an airflow or thrust. For example, power conversion unit 415 may be arranged as an axial fan (e.g., a propeller, as shown in FIG. 9), a centrifugal fan, and/or a tangential fan. Such exemplary fan arrangements may be suited to transforming rotational energy produced by power source 410 into a thrust force useful for manipulating airship 10. One of ordinary skill in the art will recognize that numerous configurations may be utilized without departing from the scope of the present disclosure.

Power conversion unit 415 may be adjustable such that an angle of attack of power conversion unit 415 may be modified. This may allow for modification to thrust intensity and direction based on the angle of attack associated with power conversion unit 415. For example, where power conversion unit 415 is configured as an adjustable airfoil (e.g., variable-pitch propellers), power conversion unit 415 may be rotated through 90 degrees to accomplish a complete thrust reversal. Power conversion unit 415 may be configured with, for example, vanes, ports, and/or other devices, such that a thrust generated by power conversion unit 415 may be modified and directed in a desired direction. Alternatively (or in addition), direction of thrust associated with power conversion unit 415 may be accomplished via manipulation of propulsion unit mount 430.

As shown in FIG. 9, for example, propulsion unit mount 430 may be operatively connected to support structure 20 and may be configured to hold a power source 410 securely, such that forces associated with propulsion assemblies 31 may be transferred to support structure 20. For example, propulsion unit mount 430 may include fastening points 455 designed to meet with a fastening location on a suitable portion of support structure 20 of hull 12. Such fastening locations may include structural reinforcement for assistance in resisting forces associated with propulsion assemblies 31 (e.g., thrust forces). Additionally, propulsion unit mount 430 may include a series of fastening points designed to match fastening points on a particular power source 410. One of ordinary skill in the art will recognize that an array of fasteners may be used for securing fastening points to obtain a desired connection between propulsion unit mount 430 and a fastening location.

According to some embodiments, propulsion unit mount 430 may include pivot assemblies configured to allow a rotation of propulsion assemblies 31 about one or more axes (e.g., axes 465 and 470) in response to a control signal provided by, for example, computer 600 (see, e.g., FIG. 30).

Figure 10:
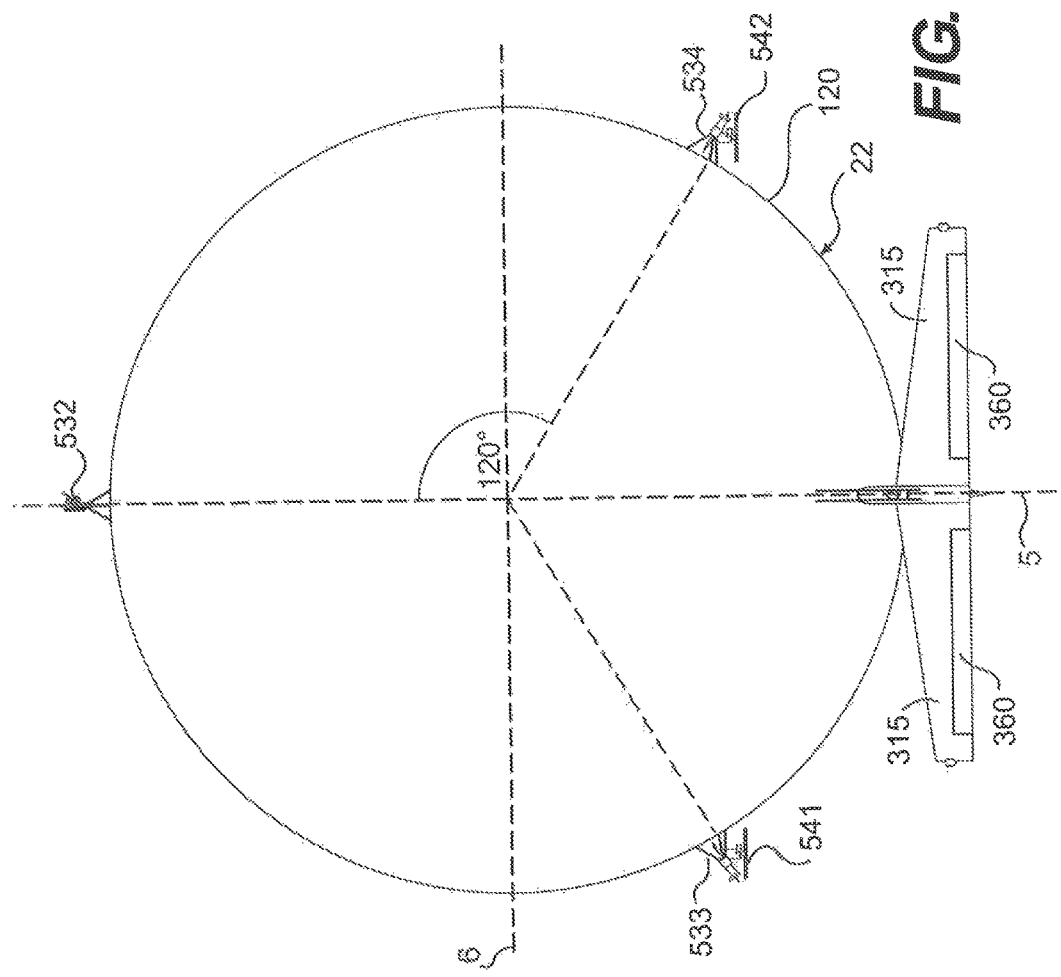
FIG. 10 illustrates a bottom view of the disclosed airship, showing an exemplary array of propulsion assemblies.
Figure 11:
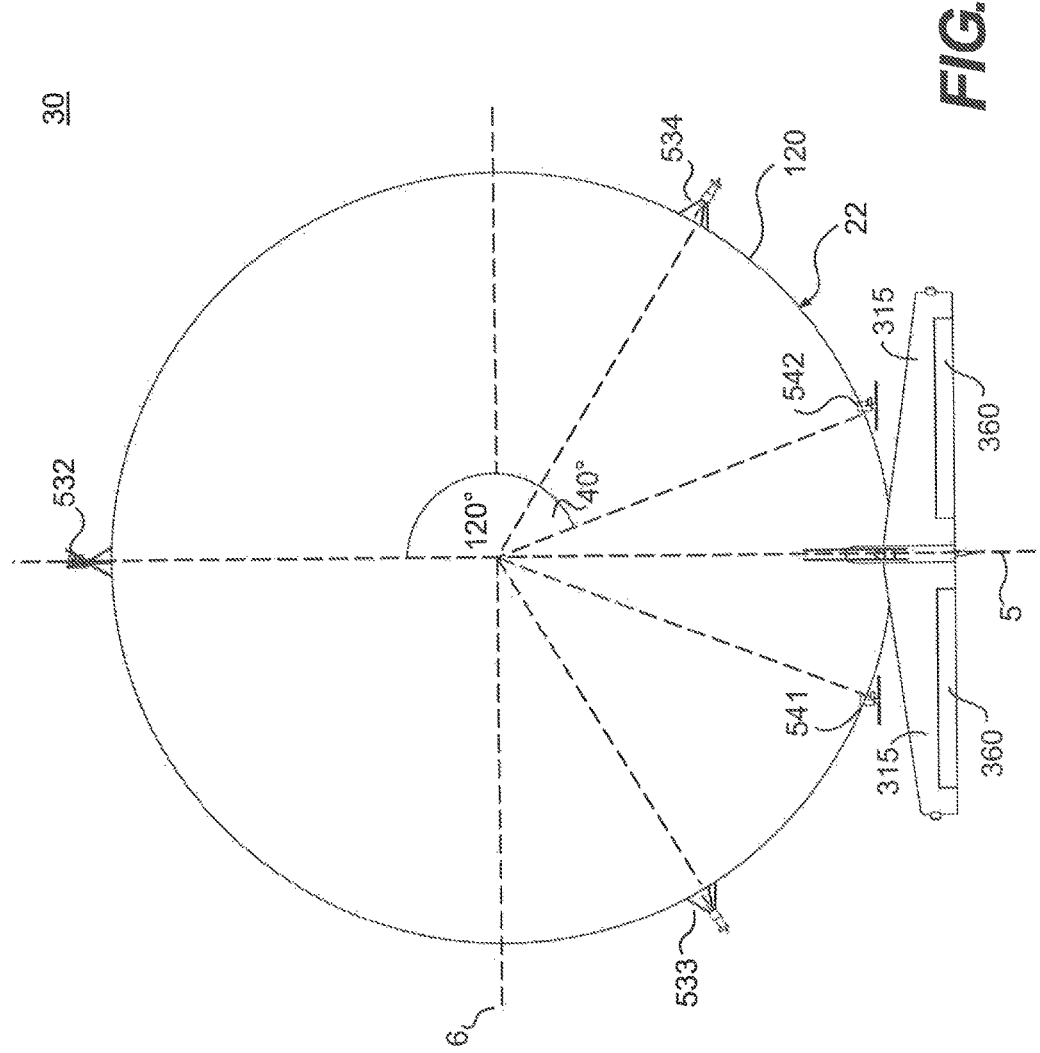
FIG. 11 illustrates a bottom view of the disclosed airship, showing another exemplary array of propulsion assemblies.

FIGS. 10 and 11B illustrate exemplary configurations (viewed from the bottom of airship 10) of a propulsion system associated with airship 10 consistent with the present disclosure. Propulsion assemblies 31 associated with airship 10 may be configured to provide a propulsive force (e.g., thrust), directed in a particular direction (i.e., a thrust vector), and configured to generate motion (e.g., horizontal motion), counteract a motive force (e.g., wind forces), and/or other manipulation of airship 10 (e.g. yaw control). For example, propulsion assemblies 31 may enable yaw, pitch, and roll control as well as providing thrust for horizontal and vertical motion. Such functionality may depend on placement and power associated with propulsion assemblies 31.

Functions associated with propulsion system 30 may be divided among a plurality of propulsion assemblies 31 (e.g., five propulsion assemblies 31). For example, propulsion assemblies 31 may be utilized for providing a lift force for a vertical take-off such that the forces of the lighter-than-air gas within first envelope 282 are assisted in lifting by a thrust force associated with the propulsion assemblies 31. Alternatively (or in addition), propulsion assemblies 31 may be utilized for providing a downward force for a landing maneuver such that the forces of the lighter-than-air gas within first envelope 282 are counteracted by a thrust force associated with the propulsion assemblies 31. In addition, horizontal thrust forces may also be provided by propulsion assemblies 31 for purposes of generating horizontal motion (e.g., flying) associated with airship 10.

It may be desirable to utilize propulsion assemblies 31 for controlling or assisting in control of yaw, pitch, and roll associated with airship 10. For example, as shown in FIG. 10, propulsion system 30 may include a fore propulsion assembly 532 operatively affixed to a fore section of keel hoop 120 and substantially parallel to and/or on roll axis 5 of airship 10. In addition to fore propulsion assembly 532, propulsion system 30 may include a starboard propulsion assembly 533 operatively affixed to keel hoop 120 at approximately 120 degrees (about yaw axis 7) relative to roll axis 5 of airship 10 and a port propulsion assembly 534 operatively affixed to keel hoop 120 at approximately negative 120 degrees (e.g., positive 240 degrees) (about yaw axis 7) relative to roll axis 5 of airship 10. Such a configuration may enable control of yaw, pitch, and roll associated with airship 10. For example, where it is desired to cause a yawing movement of airship 10, fore propulsion assembly 532 may be rotated or pivoted such that a thrust vector associated with fore propulsion assembly 532 is directed parallel to pitch axis 6 and to the right or left relative to hull 12, based on the desired yaw. Upon operation of fore propulsion assembly 532, airship 10 may be caused to yaw in reaction to the directed thrust associated with fore propulsion assembly 532.

In other exemplary embodiments, for example, where it is desired to cause a pitching motion associated with airship 10, fore propulsion assembly 532 may be rotated such that a thrust force associated with fore propulsion assembly 532 may be directed parallel to yaw axis and toward the ground (i.e., down) or toward the sky (i.e., up), based on the desired pitch. Upon operation of fore propulsion assembly 532, airship 10 may then be caused to pitch in reaction to the directed thrust associated with fore propulsion assembly 532.

According to still other embodiments, for example, where it is desired to cause a rolling motion associated with airship 10, starboard propulsion assembly 533 may be rotated such that a thrust force associated with starboard propulsion assembly 533 may be directed parallel to yaw axis 7 and toward the ground (i.e., down) or toward the sky (i.e., up) based on the desired roll, and/or port propulsion assembly 534 may be rotated such that a thrust force associated with port propulsion assembly 534 may be directed in a direction opposite from the direction of the thrust force associated with starboard propulsion assembly 533. Upon operation of starboard propulsion assembly 533 and port propulsion assembly 534, airship 10 may then be caused to roll in reaction to the directed thrusts. One of ordinary skill in the art will recognize that similar results may be achieved using different combinations and rotations of propulsion assemblies 31 without departing from the scope of the present disclosure.

Fore, starboard, and port propulsion assemblies 532, 533, and 534 may also be configured to provide thrust forces for generating forward or reverse motion of airship 10. For example, starboard propulsion unit 533 may be mounted to propulsion mount 430 and configured to pivot from a position in which an associated thrust force is directed in a downward direction (i.e., toward the ground) to a position in which the associated thrust force is directed substantially parallel to roll axis 5 and toward the rear of airship 10. This may allow starboard propulsion unit 533 to provide additional thrust to supplement thrusters. Alternatively, starboard propulsion unit 534 may be rotated from a position in which an associated thrust force is directed substantially parallel to roll axis 5 and toward the rear of airship 10, to a position where the associated thrust force is directed along pitch axis 6 such that an adverse wind force may be counteracted.

In addition to fore, starboard, and port propulsion assemblies 532, 533, and 534, respectively, propulsion system 30 may include one or more starboard thrusters 541 and one or more port thruster 542 configured to provide horizontal thrust forces to airship 10. Starboard and port thrusters 541 and 542 may be mounted to keel hoop 120, lateral frame members 122, horizontal stabilizing members 315, or any other suitable location associated with airship 10. Starboard and port thrusters 541 and 542 may be mounted using an operative propulsion unit mount 430 similar to that described above, or, alternatively, starboard and port thrusters 541 and 542 may be mounted such that minimal rotation or pivoting may be enabled (e.g., substantially fixed). For example, starboard and port thrusters 541 and 542 may be mounted to keel hoop 120 at an aft location on either side of vertical stabilizing member 310 (e.g., at approximately 160 degrees and negative 160 degrees, as shown in FIG. 58). In some embodiments, starboard and port thrusters 541 and 542 may be substantially co-located with starboard and port propulsion assemblies 533 and 534 as described above (e.g., positive 120 degrees and negative 120 degrees). In such embodiments, propulsion unit mounts 430 associated with starboard and port propulsion assemblies 533 and 534 may include additional fastening points such that propulsion unit mounts 430 associated with starboard and port thrusters 541 and 542 may be operatively connected to one another. Alternatively, propulsion unit mounts 430 associated with starboard and port thrusters 541 and 542 may be operatively connected to substantially similar fastening points on support structure 20 as fastening points connected to propulsion unit mounts 430 associated with starboard and port propulsion assemblies 533 and 534.

In some embodiments, thrust from starboard and port thrusters 541 and 542 may be directed along a path substantially parallel to roll axis 5. Such a configuration may enable thrust forces associated with starboard and port thrusters 541 and 542 to drive airship 10 in a forward or reverse direction based on the thrust direction.

In some embodiments, thrust from starboard and port thrusters 541 and 542 may be configurable based on a position of associated propulsion unit mount 430. One of ordinary skill in the art will recognize that additional configurations for starboard and port thrusters 541 and 542 may be utilized without departing from the scope of this disclosure.

Power Supply System

Figure 12A:
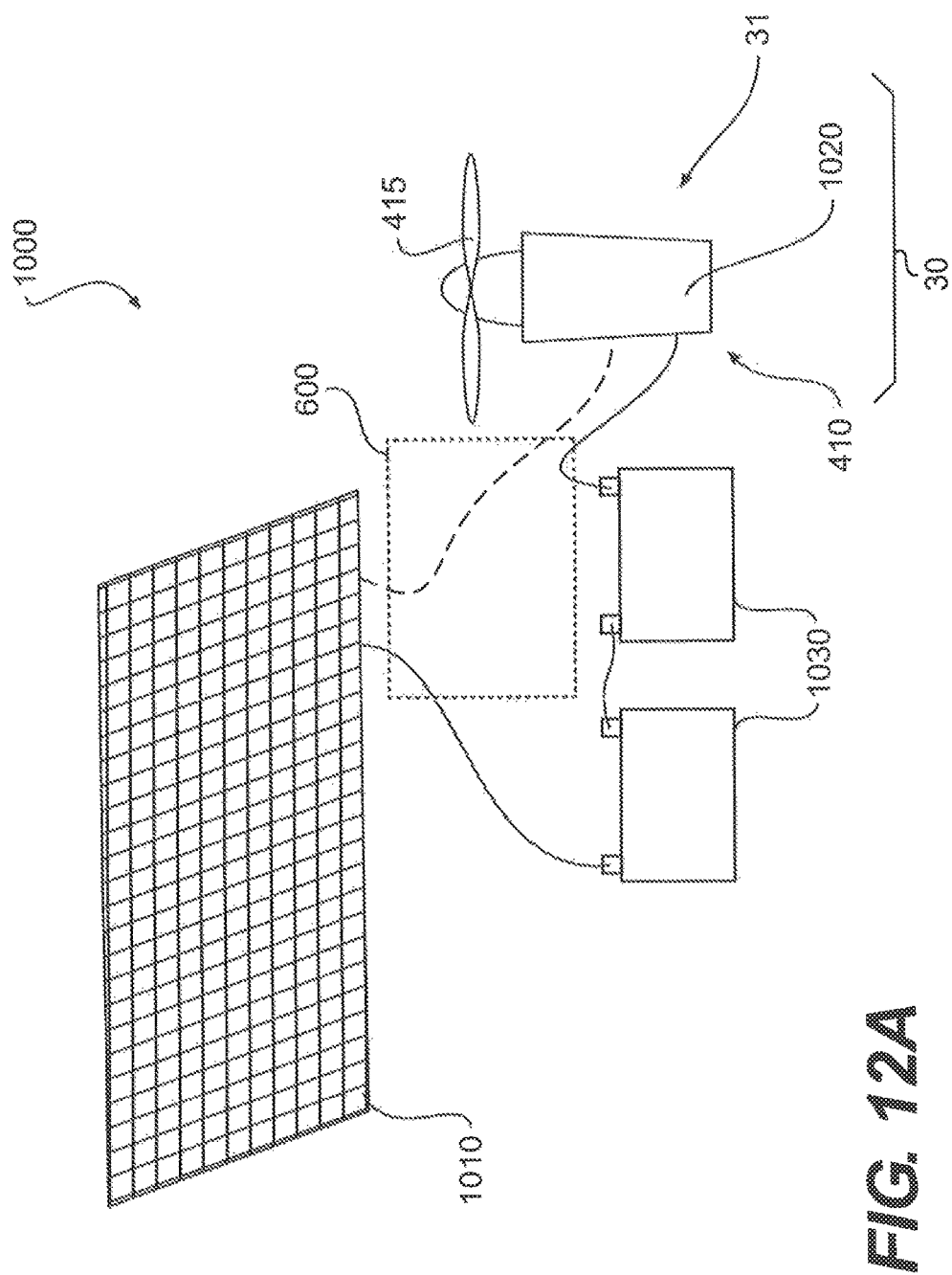
FIG. 12A illustrates an exemplary power supply system.

As shown in FIG. 12A, power supply system 1000 may include one or more solar energy converting devices, such as solar panels 1010 (including photovoltaic cells) disposed on airship 10. Solar panels 1010 may be disposed on various portions of airship 10 in a variety of different configurations. Airship 10 may include an additional or alternative solar energy converting device, such as a photovoltaic fabric. For example, in some embodiments, one or more portions of hull 12 may include a photovoltaic fabric. In one exemplary embodiment, an entire upper surface of hull 12 may include a photovoltaic fabric. FIG. 12B depicts an exemplary embodiment of airship 10, wherein the entire upper surface of hull 12 forms a solar energy converting device, e.g., either a solar panel or photovoltaic fabric.

Persons of ordinary skill in the art will recognize the requirements of solar panels suitable for the applications disclosed herein. Further, the disclosed configurations and placement of solar panels shown and discussed herein are not intended to be limiting, and persons of ordinary skill in the art will understand that additional embodiments are possible.

Solar panels 1010 may be operatively coupled to one or more electric motors 1020, and configured to supply power to one or more electric motors 1020 for driving power conversion units 415. In addition, power supply system 1000 may include one or more batteries 1030 operatively coupled to solar panel 1010 and configured to receive and store electrical energy supplied by solar panel 1010, and may further be operatively coupled to electric motors 1020 to supply power to electric motors 1020.

Batteries 1030 may each be located within an outer envelope of airship 10 defined by hull 12 of airship 10. Batteries 1030 may be disposed in respective positions providing ballast.

Persons of ordinary skill in the art will recognize suitable operative connections between solar panel 1010, batteries 1030, and electric motors 1020, according to the arrangements described above.

Cargo System

As used herein, the term "cargo" is intended to encompass anything carried by airship 10 that is not a part of airship 10. For example, the term "cargo," as used herein, refers to freight, as well as passengers. Further, the term "passengers" is intended to encompass not only persons along for the ride, but also pilots and crew.

Figure 13A:
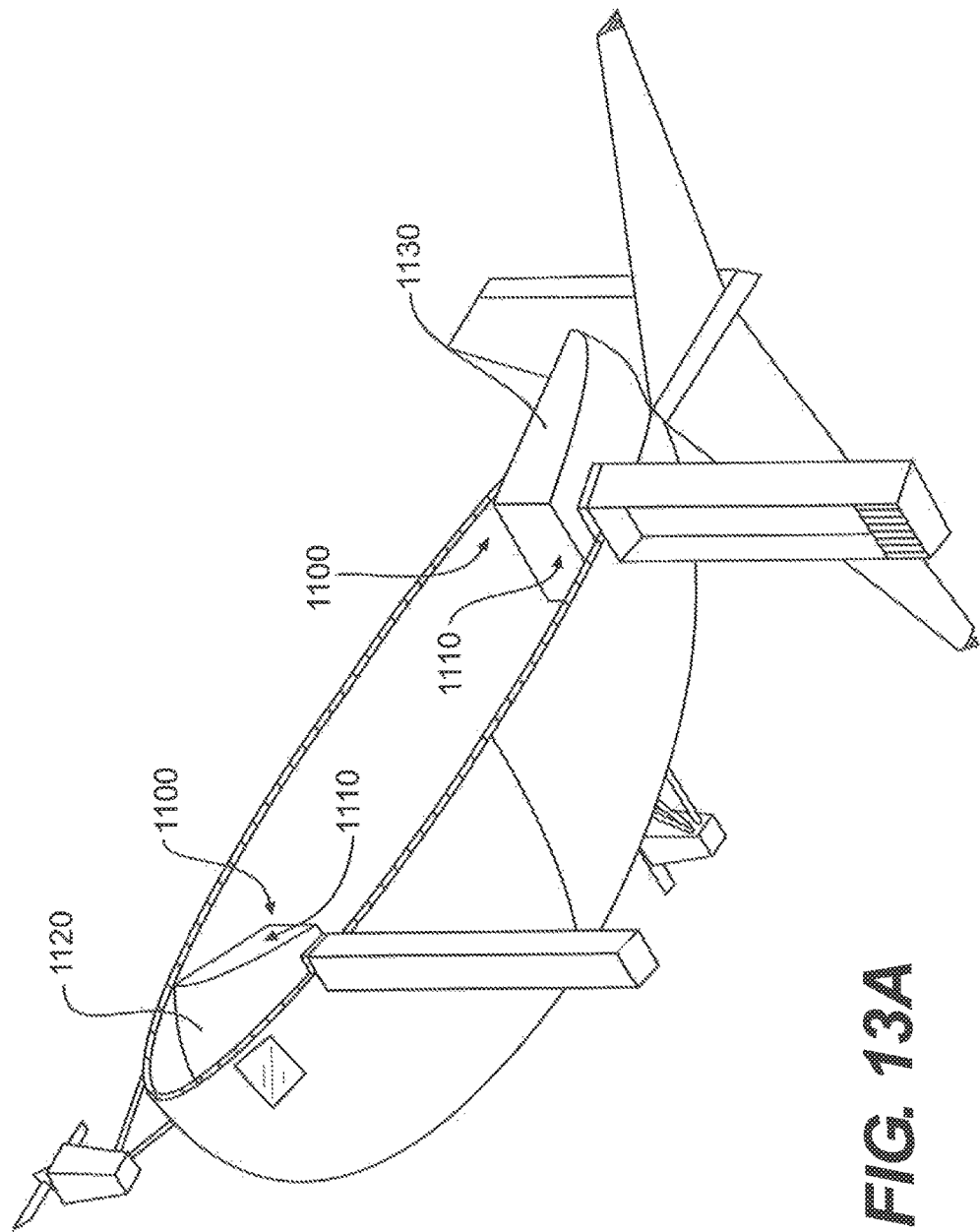
FIG. 13A illustrates a cutaway view of an exemplary disclosed airship embodiment having cargo compartments, wherein a transport system is deployed from the cargo compartments.
Figure 13B:
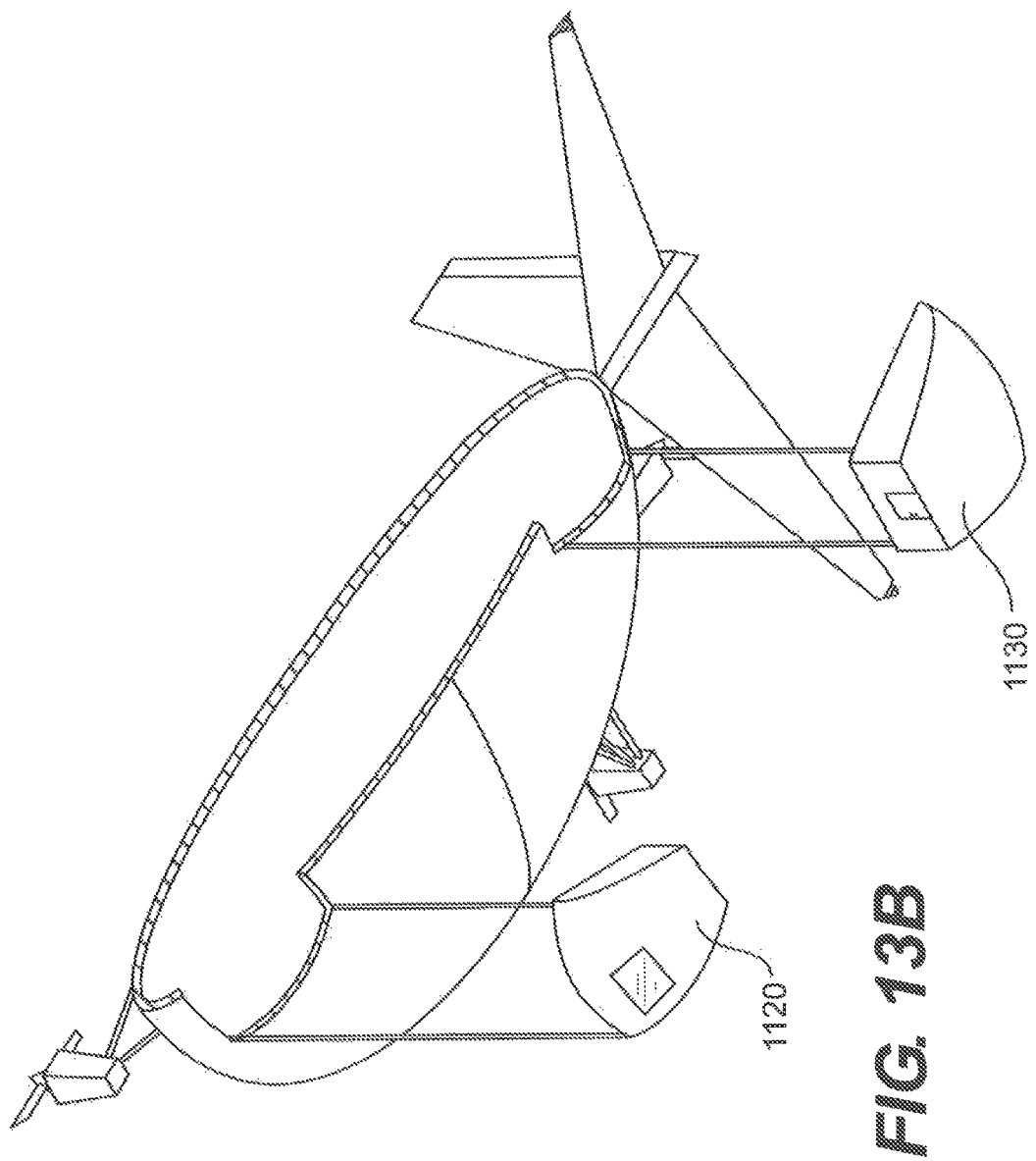
FIG. 13B illustrates a cutaway view of another airship embodiment wherein the cargo compartments, themselves, are deployed.

As shown in FIGS. 13A-13B, airship 10 may include a cargo system 1100, which may include at least one cargo compartment 1110 configured to contain passengers and/or freight, and disposed substantially within the outer envelope of the airship, which is defined by hull 12. In some embodiments, airship 10 may include multiple cargo compartments 1110 as shown in the accompanying figures. Cargo compartments 1110 may be of any suitable size and/or shape, and may include, for example, a passenger compartment 1120, which may include a pilot cockpit and/or accommodations (e.g., seating and/or lodging) for commercial travelers/tourists. In some embodiments, cargo compartments 1110 may include a freight compartment 1130. In some embodiments, airship 10 may include a passenger compartment 1120 and a separate freight compartment 1130.

Although the figures show cargo compartments 1110 generally disposed in the bottom portion of airship 10 and having a lower surface that conforms to, or is substantially continuous with, the envelope defined by hull 12, cargo compartments 1110 may have any suitable shape. Further, cargo compartments 1110 may be disposed in a location other than the bottom of airship 10. For example, embodiments are envisioned that include a passenger compartment disposed near the top portion of hull 12. Such embodiments may be practical, for example, if the passenger compartment is relatively small, e.g., to only hold a flight crew and/or several passengers.

In some embodiments, cargo compartments 1110 may be relatively small compared to the overall size of airship 10, as shown in FIG. 13A. Alternatively, cargo compartments 1110 may be significantly larger.

Persons of ordinary skill in the art will recognize that the size, shape, and location may be selected according to numerous parameters related to the intended operation of the airship, such as weight, ballast, desired lifting gas volume (since the internally-located cargo compartments come at the expense of lifting gas volume), etc. For example, in some embodiments one or more of cargo compartments 1110 may be disposed at a location such that a static equilibrium associated with airship 10 may be maintained. In such embodiments, a cargo compartment 1110 may be mounted, for example, at a location along roll axis 5, such that a moment about pitch axis 6 associated with the mass of the cargo compartment (or the mass of the cargo compartment including contents having a predetermined mass) substantially counteracts a moment about pitch axis 6 associated with the mass of empennage assembly 25. Furthermore, the placement of cargo compartments 1110 within the envelope of hull 12, places the mass of cargo compartments 1110 and any contents therein closer to both roll axis 5 and pitch axis 6, thus reducing moments associated with placement of such mass at distances from these axes. Similarly, positioning of cargo compartments 1110 relative to yaw axis 7 may also be taken into consideration.

In some embodiments, cargo compartments 1110 may include a suitable means of access, such as a ladder, stairs, or ramp. In other embodiments, at least one cargo compartment 1110 of airship 10 may include a transport system 1140 configured to lower and raise at least a portion of cargo compartment 1110 to facilitate loading and unloading of cargo compartment 1110.

Bladders

Airship 10 may include one or more bladders 1200 inside hull 12 for containing a lighter-than-air gas, as shown in FIG. 14. In some embodiments, airship 10 may include multiple bladders 1200 disposed within hull 12 in a side-by-side, end-to-end, and/or stacked configuration. FIG. 14 illustrates an exemplary embodiment having four bladders 1200 disposed in four quadrants of hull 12. Other configurations for bladders 1200 are also possible.

In some embodiments, bladders 1200 may be formed of a self-sealing material. As discussed above with respect to hull 12, persons of ordinary skill in the art will recognize self-sealing technologies suitable for implementation in bladders 1200.

As an alternative to, or in addition to, multiple bladders 1200, envelope 282 associated with hull 12 may be divided by a series of "walls" or dividing structures (not shown) within envelope 282. These walls may create separated "compartments" that may each be filled with a lighter-than-air lifting gas individually. Such a configuration may mitigate the consequences of the failure of one or more compartments (e.g., a leak or tear in the fabric) such that airship 10 may still possess some aerostatic lift upon failure of one or more compartments. In some embodiments, each compartment may be in fluid communication with at least one other compartment, and such walls may be fabricated from materials similar to those used in fabrication of envelope 282, or, alternatively (or in addition), different materials may be used. According to some embodiments, envelope 282 may be divided into four compartments using "walls" created from fabric similar to that used to create envelope 282. One of skill in the art will recognize that more or fewer compartments may be utilized as desired.

One or more of the compartments or bladders 1200 within envelope 282 may include one or more fill and/or relief valves (not shown) configured to facilitate inflation, while minimizing the risk of over-inflation of envelope 282 and/or bladders 1200. Such valves may be designed to allow entry of a lighter-than-air gas as well as allowing escape of lighter-than-air gas upon an internal pressure reaching a predetermined value (e.g., about 150 to 400 Pascals). One of skill in the art will recognize that more or fewer fill/relief valves may be used as desired and that relief pressures may be selected based on materials associated with envelope 282 and/or bladders 1200, among other things.

Airship 10 may also include a second envelope 283 (see FIG. 3), thus defining a space between first envelope 282 and second envelope 283, which may be utilized as a ballonet for airship 10. For example, a ballonet may be used to compensate for differences in pressure between a lifting gas within first envelope 282 and the ambient air surrounding airship 10, as well as for ballasting of an airship. The ballonet may therefore allow hull 12 to maintain its shape when ambient air pressure increases (e.g., when airship 10 descends). The ballonet may also help control expansion of the lighter-than-air gas within first envelope 282 (e.g., when airship 10 ascends), substantially preventing bursting of first envelope 282 at higher altitudes. Pressure compensation may be accomplished, for example, by pumping air into, or venting air out of, the ballonet as airship 10 ascends and descends, respectively. Such pumping and venting of air may be accomplished via air pumps, vent tabs, or other suitable devices (e.g., action of the propulsion system 30) associated with hull 12. For example, in some embodiments, as airship 10 ascends, air pumps (e.g., an air compressor) may fill the space between first envelope 282 and second envelope 283 with air such that a pressure is exerted on first envelope 282, thereby restricting its ability to expand in response to decreased ambient pressure. Conversely, as airship 10 descends, air may be vented out of the ballonet, thereby allowing first envelope 282 to expand and assisting hull 12 in maintaining its shape as ambient pressure increases on hull 12.

Empennage Assembly

Figure 15D:
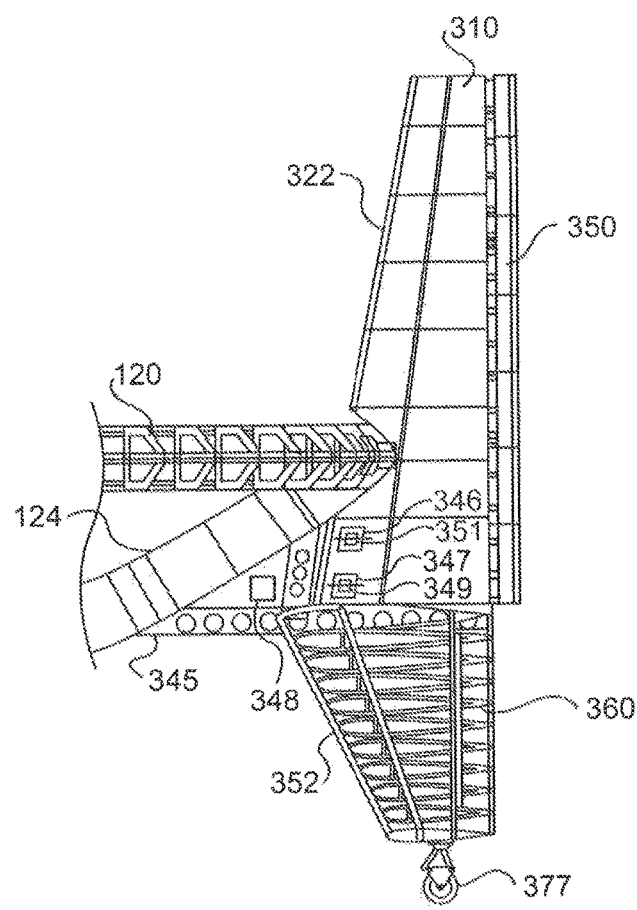

FIG. 15A illustrates an exemplary empennage assembly 25. Empennage assembly 25 may be configured to provide stabilization and/or navigation functionality to airship 10. Empennage assembly 25 may be operatively connected to support structure 20 via brackets, mounts, and/or other suitable methods. For example, in some embodiments, an empennage mount 345 similar to that shown in FIG. 15B may be used for operatively connecting empennage assembly 25 to longitudinal frame member 124 and keel hoop 120 (see FIGS. 2 and 15D).

FIG. 15D is a schematic view highlighting an exemplary mounting configuration between empennage 25, keel hoop 120, and longitudinal support member 124, utilizing empennage mount 345. One of ordinary skill in the art will recognize that numerous other mounting configurations may be utilized and are intended to fall within the scope of the present disclosure.

According to some embodiments, as shown in FIGS. 15A and 15D, empennage assembly 25 may include a vertical stabilizing member 310 and horizontal stabilizing members 315. Vertical stabilizing member 310 may be configured as an airfoil to provide airship 10 with stability and assistance in yaw/linear flight control. Vertical stabilizing member 310 may include a leading edge, a trailing edge, a pivot assembly, one or more spars, and one or more vertical control surfaces 350 (e.g., a rudder).

Vertical stabilizing member 310 may be pivotally affixed to a point on empennage assembly 25. During operation of airship 10, vertical stabilizing member 310 may be directed substantially upward from a mounting point of empennage assembly 25 to support structure 20 while the upper-most point of vertical stabilizing member 310 remains below or substantially at the same level as the uppermost point on the top surface of hull 12. Such a configuration may allow vertical stabilizing member 310 to maintain isotropy associated with airship 10. Under certain conditions (e.g., free air docking, high winds, etc.), vertical stabilizing member 310 may be configured to pivot about a pivot assembly within a vertical plane such that vertical stabilizing member 310 comes to rest in a horizontal or downward, vertical direction, and substantially between horizontal stabilizing members 315. Such an arrangement may further enable airship 10 to maximize isotropy relative to a vertical axis, thereby minimizing the effects of adverse aerodynamic forces, such as wind cocking with respect to vertical stabilizing member 310. In some embodiments consistent with the present disclosure, where hull 12 includes a thickness dimension of 7 meters and where empennage assembly 25 is mounted to keel hoop 120 and longitudinal frame member 124, vertical stabilizing member 310 may have a height dimension ranging from about 3 meters to about 4 meters.

Vertical stabilizing member 310 may also include one or more vertical control surfaces 350 configured to manipulate airflow around vertical stabilizing member 310 for purposes of controlling airship 10. For example, vertical stabilizing member 310 may include a rudder configured to exert a side force on vertical stabilizing member 310 and thereby, on empennage mount 345 and hull 12. Such a side force may be used to generate a yawing motion about yaw axis 7 of airship 10, which may be useful for compensating for aerodynamic forces during flight. Vertical control surfaces 350 may be operatively connected to vertical stabilizing member 310 (e.g., via hinges) and may be communicatively connected to systems associated with a pilot cockpit (e.g., operator pedals) or other suitable location. For example, communication may be established mechanically (e.g., cables) and/or electronically (e.g., wires and servo motors 346 and/or light signals) with the cockpit or other suitable location (e.g., remote control). In some embodiments, vertical control surfaces 350 may be configured to be operated via a mechanical linkage 351. In some cases, mechanical linkage 351 may be operably connected to one or more servo motors 346, as shown in FIGS. 15A and 15D.

Horizontal stabilizing members 315 associated with empennage assembly 25 may be configured as airfoils and may provide horizontal stability and assistance in pitch control of airship 10. Horizontal stabilizing members 315 may include a leading edge, a trailing edge, one or more spars, and one or more horizontal control surfaces 360 (e.g., elevators).

In some embodiments, horizontal stabilizing members 315 may be mounted on a lower side of hull 12 in an anhedral (also known as negative or inverse dihedral) configuration. In other words, horizontal stabilizing members 315 may extend away from vertical stabilizing member 310 at a downward angle relative to roll axis 5. The anhedral configuration of horizontal stabilizing members 315 may allow horizontal stabilizing members 315 to act as ground and landing support for a rear section of airship 10. Alternatively, horizontal stabilizing members 315 may be mounted in a dihedral or other suitable configuration.

According to some embodiments, horizontal stabilizing members 315 may be operatively affixed to empennage mount 345 and/or vertical stabilizing member 310 independent of hull 12. Under certain conditions (e.g., free air docking, high winds, etc.) empennage assembly 25 may be configured to allow vertical stabilizing member 310 to pivot within a vertical plane, such that vertical stabilizing member 310 comes to rest substantially between horizontal stabilizing members 315.

Horizontal stabilizing members 315 may also include one or more horizontal control surfaces 360 (e.g., elevators) configured to manipulate airflow around horizontal stabilizing members 315 to accomplish a desired effect. For example, horizontal stabilizing members 315 may include elevators configured to exert a pitching force (i.e., up or down force) on horizontal stabilizing members 315. Such a pitching force may be used to cause motion of airship 10 about pitch axis 6. Horizontal control surfaces 360 may be operatively connected to horizontal stabilizing members 315 (e.g., via hinges) and may be mechanically (e.g., via cables) and/or electronically (e.g., via wires and servo motors 347 and/or light signals) controlled from a pilot cockpit or other suitable location (e.g., remote control). In some embodiments, horizontal control surfaces 360 may be configured to be operated via a mechanical linkage 349. In some cases, mechanical linkage 349 may be operably connected to one or more servo motors 347, as shown in FIG. 15A.

FIG. 15B is an illustration of an exemplary embodiment of empennage mount 345. Empennage mount 345 may be configured to operatively connect vertical stabilizing member 310, horizontal stabilizing members 315, and support structure 20. Empennage mount 345 may include similar high-strength, low-weight materials discussed with reference to support structure 20 (e.g., carbon fiber honeycomb sandwich). Further, empennage mount 345 may include fastening points configured to mate with fastening points present on support structure 20. For example, longitudinal frame member 124 and/or keel hoop 120 may be configured with fastening points near a rear location of keel hoop 120 (e.g., at approximately 180 degrees around keel hoop 120). Such fastening points may be configured to mate with fastening points provided on empennage mount 345. One of ordinary skill in the art will recognize that numerous fastener combinations may be utilized for fastening empennage mount 345 to the related fastening points of heel hoop 220 and longitudinal frame member 124.

Empennage mount 345 may include pins, hinges, bearings, and/or other suitable devices to enable such a pivoting action. In some embodiments, vertical stabilizing member 310 may be mounted on a swivel pin (not shown) associated with empennage mount 345 and may include a latching mechanism (not shown) configured to operatively connect vertical stabilizing member 310 to keel hoop 120 and/or other suitable location. Latching mechanism (not shown) may include hawksbill latches, slam latches, spring loaded pins, striker plates, hydraulic actuators, and/or any other combination of suitable mechanisms. Control of latching mechanism (not shown) and pivoting of vertical stabilizing member 310 may be achieved utilizing mechanical (e.g., via cables) and/or electrical (e.g., via control signals and servo motors), or any other suitable control methods (e.g., via hydraulics).

Rear Landing Gear

When, for example, horizontal stabilizing members 315 are configured in an anhedral arrangement (i.e., angled downward away from hull 12) and are connected to a lower side of airship 10, horizontal stabilizing members 315 may function as ground and landing support for a rear section of airship 10. Accordingly, empennage assembly 25, specifically horizontal stabilizing members 315 may provide support for rear landing gear assembly 377.

Rear landing gear assembly 377 may be operatively connected to each airfoil associated with horizontal stabilizing members 315 (e.g., as shown in FIG. 15C). Rear landing gear assembly 377 may include one or more wheels 378, one or more shock absorbers 381, and mounting hardware 379. Rear landing gear assemblies 377 may be connected to horizontal stabilizing members 315 at a tip end and/or any other suitable location (e.g., a midpoint of horizontal stabilizing members 315).

In some embodiments, rear landing gear assembly 377 may include a single wheel mounted on an axle operatively connected via oleo-pneumatic shock-absorbers to horizontal stabilizing members 315 at an outer-most tip of each airfoil. Such a configuration may allow rear landing gear assembly 377 to provide a damping force in relation to an input (e.g., forces applied during touchdown and landing). Horizontal stabilizing member 315 may further assist in such damping based on configuration and materials used. One of ordinary skill in the art will recognize that rear landing gear assemblies 377 may include more or fewer elements as desired.

Rear landing gear assembly 377 may be configured to perform other functions including, for example, retracting and extending (e.g., with respect to horizontal stabilizing members 315), and/or adjusting for a load associated with airship 10. One of ordinary skill in the art will recognize that numerous configurations may exist for rear landing gear assembly 377 and any such configuration is meant to fall within the scope of this disclosure.

Front Landing Gear

According to some embodiments, support structure 20 may be configured to provide support as well as an operative connection to front landing gear assembly 777 (see FIG. 8). Front landing gear assembly 777 may include one or more wheels, one or more shock absorbers, and mounting hardware. Front landing gear assembly 777 may be connected to support structure 20 at a location configured to provide stability during periods when airship 10 is at rest or taxiing on the ground. One of ordinary skill in the art will recognize that various positioning configurations of front landing gear assembly 777 (e.g., in front of passenger compartment 1120) may be used without departing from the scope of this disclosure. In some embodiments, front landing gear 777 may include dual wheels mounted on an axle operatively connected via oleo-pneumatic shock-absorbers to support structure 20 or passenger compartment 1120.

Figure 16:
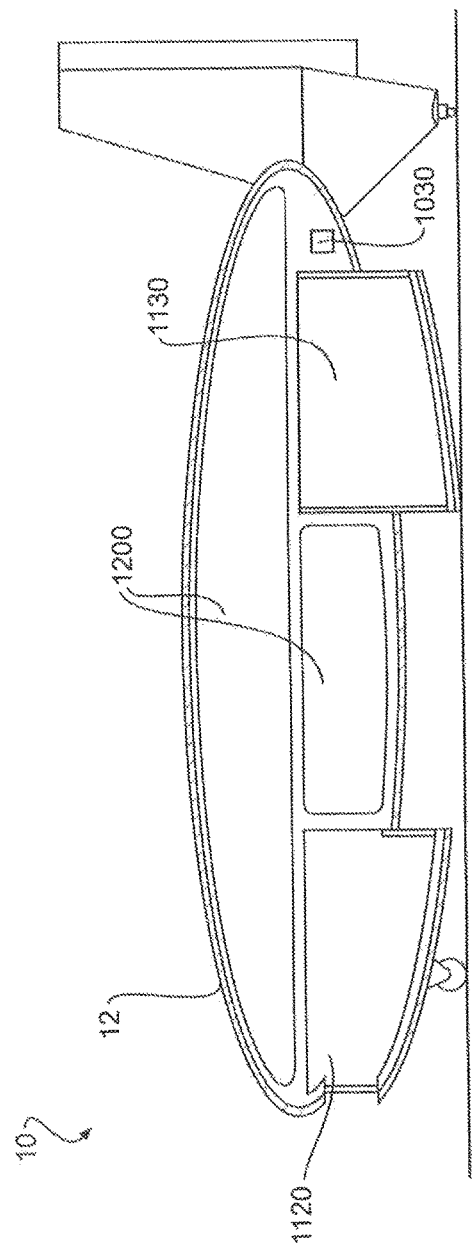
FIG. 16 illustrates a partial cross-sectional view of an exemplary airship embodiment having front landing gear deployable with a passenger compartment.

In some embodiments, front landing gear assembly 777 may be mounted on passenger compartment 1120, and may be deployed by virtue of the extension/lowering of passenger compartment 1120, as shown in FIG. 16.

According to some embodiments, front landing gear assembly 777 may be configured to perform other functions including, for example, steering airship 10 while on the ground, retracting, extending, adjusting for load, etc. For example, front landing gear assembly 777 may include an operative connection to passenger compartment 1120 such that front landing gear assembly 777 may be turned to cause airship 10 to head in a desired direction while moving on the ground. Such a connection may include a rack and pinion, a worm gear, an electric motor, and/or other suitable devices for causing front landing gear assembly 777 to turn in response to a steering input.

According to some embodiments, front landing gear assembly 777 may include an operative connection to a steering control associated with a yoke in passenger compartment 1120. An operator may turn the yoke causing a signal indicative of a steering force to be sent to computer 600. Computer 600 may then cause an electric motor associated with front landing gear assembly 777 to cause front landing gear assembly 777 to turn in a direction indicated by the steering force input from the operator. Alternatively, steering may be accomplished via a mechanical connection (e.g., cables, hydraulics, etc.) or any other suitable method. One of ordinary skill in the art will recognize that a steering control may be linked to flight controls, a dedicated steering control, and/or other suitable control without departing from the scope of the present disclosure.

Aerodynamic Components

Figure 17:
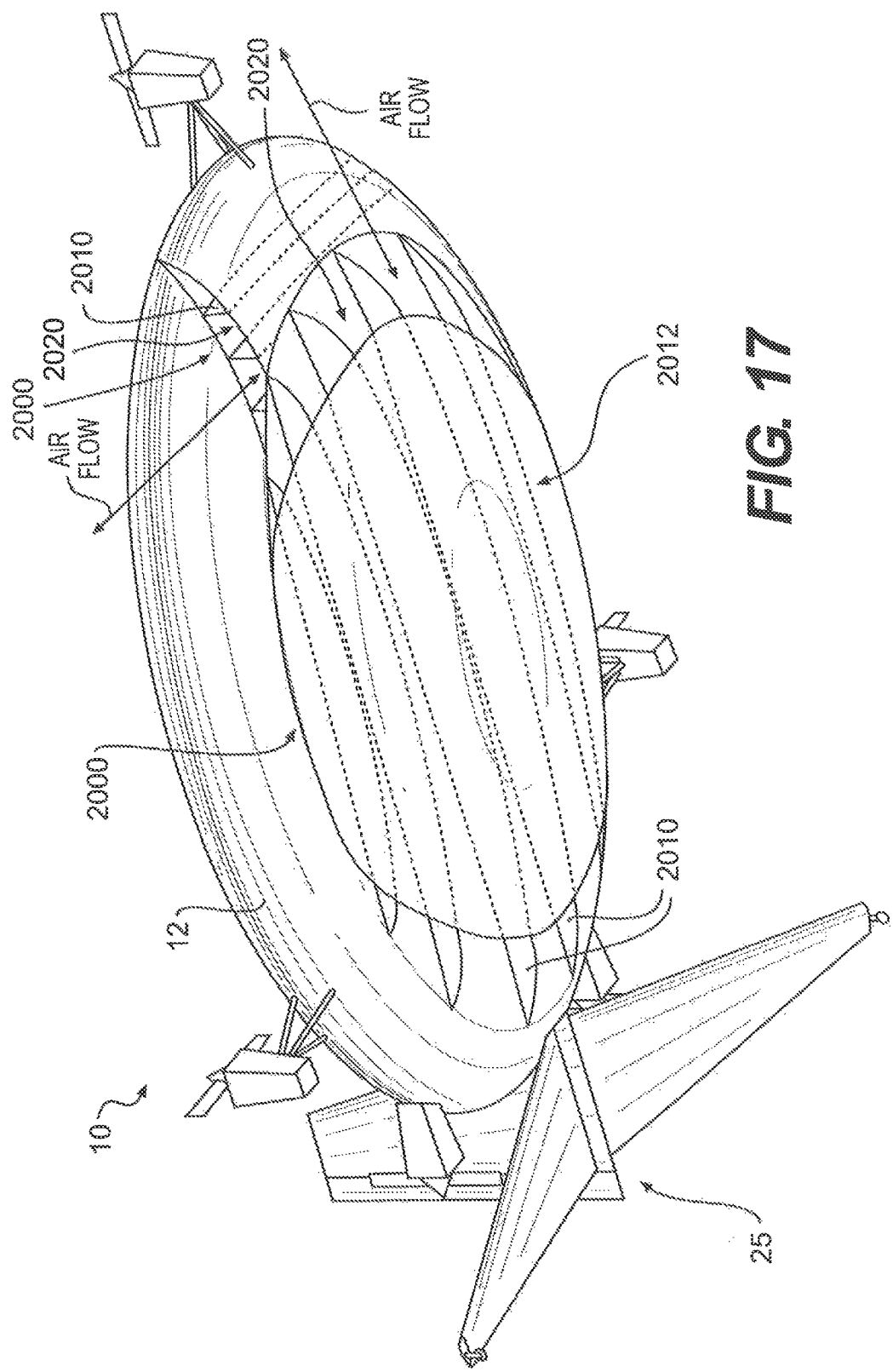
FIG. 17 illustrates an exemplary embodiment of an airship having bottom-mounted aerodynamic components.
Figure 18:
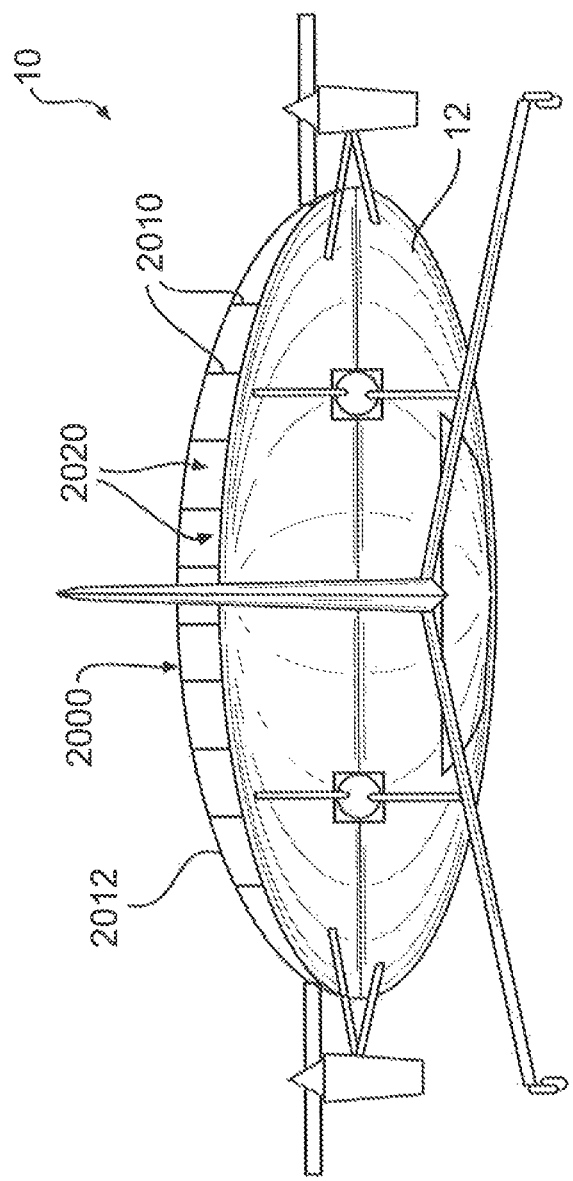
FIG. 18 is a rear view of an airship having an aerodynamic component spanning the entire width of the top portion of the airship.

According to some embodiments, hull 12 may include one or more aerodynamic components 2000 to provide stabilization of airship 10. Aerodynamic components 2000 may be associated with hull 12 and may be configured to direct airflow along airship 10. For example, in some embodiments, as shown in FIG. 1, aerodynamic components 2000 may include one or more fairing structures such as, for example, a plurality of slats 2010 separating and/or defining a plurality of parallel airflow passages 2020. As shown in FIG. 1, in some embodiments, passages 2020 may also be defined by covers 2012 and an outer surface of hull 12. Slats 2010 may be arranged in any suitable direction, for example, with a fore-aft orientation and/or a port-starboard orientation. Further, slats 2010 may be disposed on a top portion of hull 12, as shown in FIG. 1, and/or on a bottom portion of hull 12, as shown in FIG. 17. Also, the amount of surface area covered by aerodynamic components 2000 may be selected based on the anticipated use and/or environment in which airship 10 may be used. In some embodiments, the width of an aerodynamic component may span substantially the entire width of airship 10, as shown for example in FIG. 18. In other embodiments, the width of an aerodynamic component may span a distance that is less than the full width of airship 10, as shown in FIG. 1.

In some embodiments, multiple aerodynamic components 2000 may be disposed separately on hull 12, as shown for example in FIG. 1. FIG. 1 shows an exemplary configuration wherein a longitudinally-oriented aerodynamic component 2000 is disposed centrally on the top portion of hull 12, and transversely-oriented aerodynamic components 2000 are disposed fore and aft of the centrally-mounted, longitudinally-oriented aerodynamic component 2000.

Figure 19:
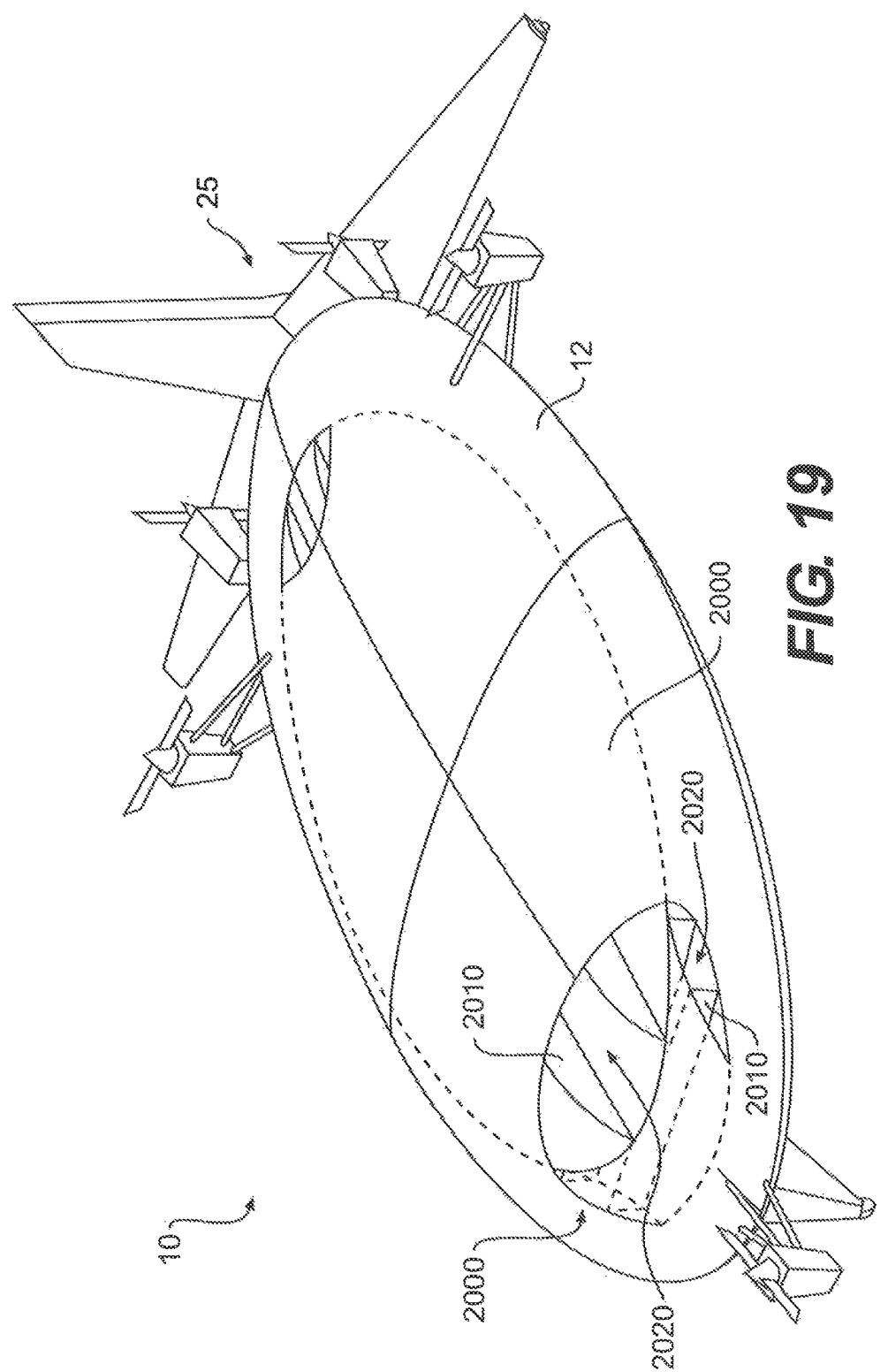
FIG. 19 is an exemplary embodiment of an airship having aerodynamic structures that do not protrude from the envelope of the hull of the airship.

Alternatively, or additionally, two or more aerodynamic components 2000 may abut one another and/or overlap one another, as shown in FIG. 19. For example, FIG. 19 shows an exemplary configuration wherein a transversely-oriented aerodynamic component 2000 is disposed partially below a centrally-disposed, longitudinally-oriented aerodynamic component 2000.

Aerodynamic component 2000 may be configured to minimize the susceptibility of airship 10 to winds passing over airship 10 off-axis with respect to aerodynamic component 2000, that is, in a direction that is not aligned (i.e., not parallel) with slats 2010. For example, in some embodiments, slats 2010 may be integrated into hull 12, such that the surface shape of hull 12 remains unchanged, and aerodynamic component 2000 may be exposed to airflow by a relatively small opening in hull 12, as shown in FIG. 19. In other embodiments, aerodynamic component 2000 may protrude from the contour of hull 12, but may still have a relatively low profile and smooth transition from hull 12 so as to limit the amount of drag created by aerodynamic component 2000 in off-axis directions. (See, e.g., FIG. 1.) In other embodiments, hull 12 may have a second skin within which aerodynamic components 2000 may be integrated, as shown for example, in FIG. 20.

Slats 2010 may be made of any suitable material. In some embodiments, slats 2010 may be formed of a rigid material, such as plastic, carbon fiber, aluminum, titanium, etc. Some embodiments may alternatively, or additionally, include slats 2010 formed of a flexible material, such as a fabric, e.g., the same fabric that may be used to form hull 12, Slats 2010 may have a uniform cross sectional shape along the length thereof, e.g., a thin-walled partition. Some embodiments may include slats 2010 having a non-uniform cross-sectional shape. For example, slats 2010 may have an airfoil shape (e.g., in a fore-aft direction), or a modified airfoil shape, such as a kamm tail.

Figure 21:
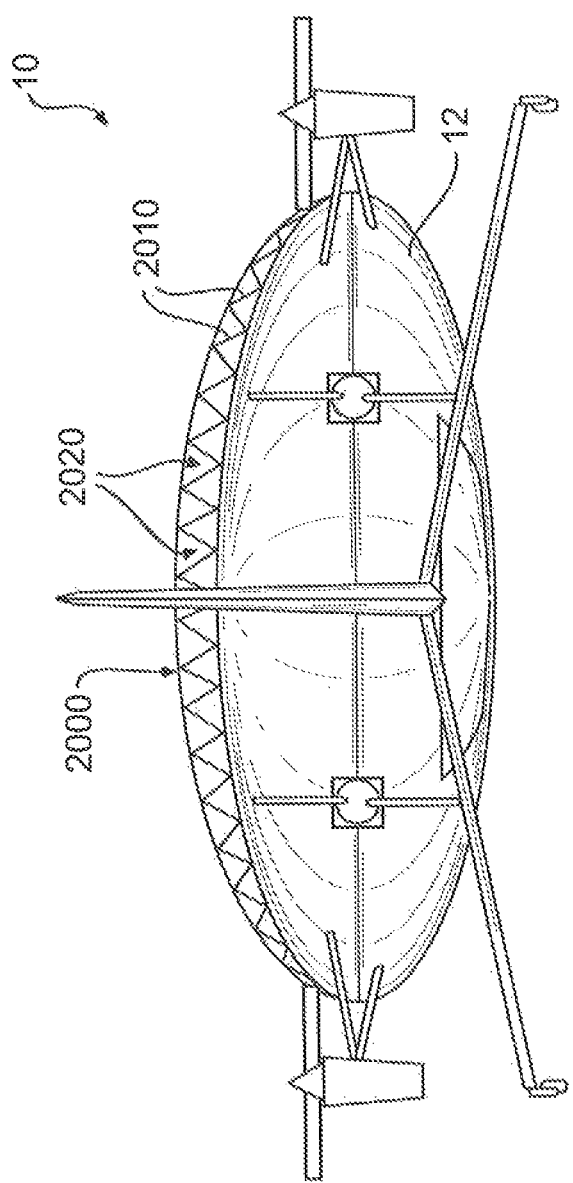
FIG. 21 is an exemplary airship embodiment wherein fairing structures of the aerodynamic component are diagonally oriented.

In some embodiments, slats 2010 may be parallel, as shown in FIG. 1. Alternatively, or additionally, airship 10 may include slats 2010 having a different configuration. For example, slats 2010 may be arranged in an alternating diagonal configuration, as shown in FIG. 21. In embodiments wherein slats 2010 are rigid, the alternating diagonal configuration may provide enhanced structural support, as it may form a truss-like structure.

Figure 20:
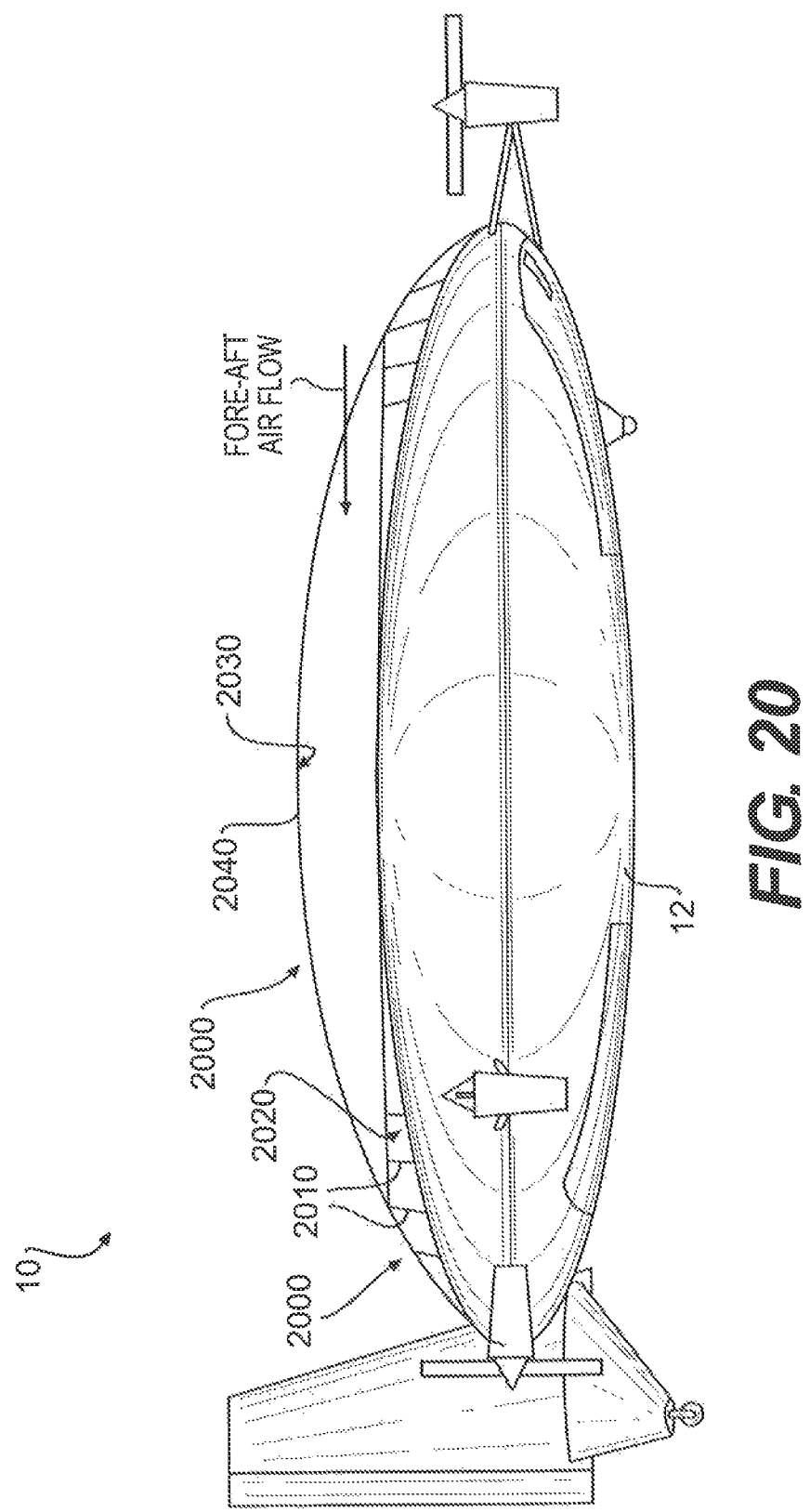
FIG. 20 is an exemplary airship embodiment having overlapping aerodynamic components.
Figure 22:
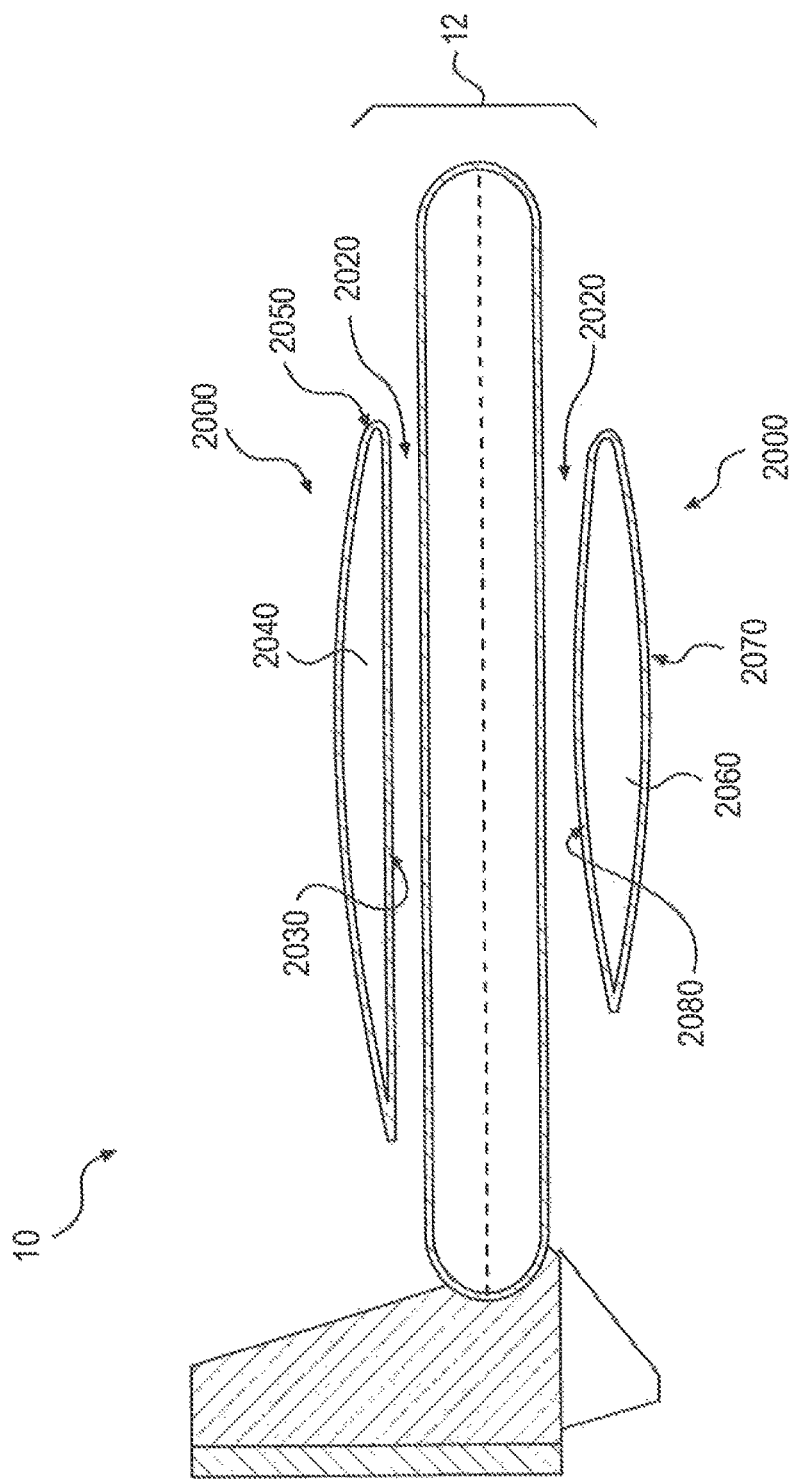
FIG. 22 is a cross-sectional view of an exemplary airship embodiment having aerodynamic components configured to produce aerodynamic lift during flight.

Aerodynamic components 2000 may include inside wall surfaces of airflow passages 2020 that may be substantially planar, or may be curved. In some embodiments, as shown in FIG. 20, an upper wall 2030 may be the underside of a top portion 2040 of hull 12, and thus, may be curved upward. In other embodiments, as shown in FIG. 22, upper surface 2030 may be substantially planar (e.g., horizontal, or in any plane deemed suitable). In some embodiments, upper surface 2030 may be substantially planar, and a front edge 2050 of aerodynamic component 2000 may have a curvature such that the portion of hull 12 between airflow passages 2020 and top portion 2040 of hull 12 may have an asymmetrical airfoil cross-sectional shape, as shown in FIG. 22. This configuration may create aerodynamic lift, during flight. In such embodiments, a bottom side aerodynamic component 2000 may be disposed on a bottom portion 2060 of airship 10, and the cross-sectional shape of the hull portion between airflow passages 2020 of bottom side aerodynamic component 2000 and a bottom surface 2070 of hull 12 may have a substantially symmetrical cross sectional shape (by virtue of a curved lower wall 2080 and similarly curved bottom surface 2070) so as to prevent a counteracting aerodynamic force from canceling out the aerodynamic lift created by aerodynamic component 2000 on the upper portion of airship 10. Further, in some embodiments, the narrowed airflow passage 2020 created by curved lower wall 2080 at bottom portion 2060 may accelerate airflow compared to airflow passing across the underside of bottom surface 2070, thereby creating additional aerodynamic lift.

Figure 23:
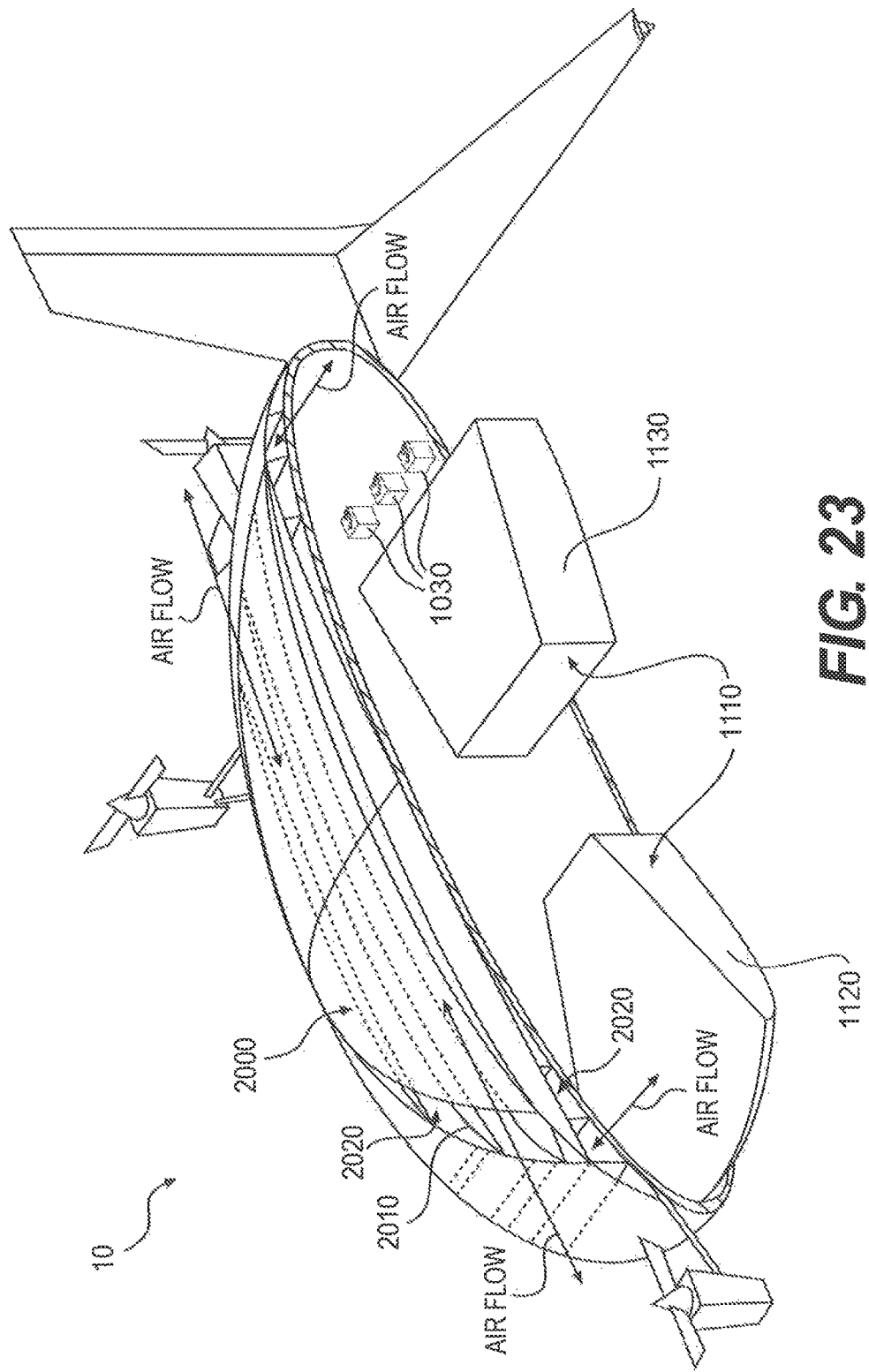
FIG. 23 is a cutaway view of another exemplary embodiment of an airship having multiple aerodynamic components.

FIG. 23 illustrates a cutaway, perspective view of an airship having an embodiment of aerodynamic components 2000 similar to that shown in FIG. 20. For example, like the embodiment shown in FIG. 23, FIG. 20 shows an embodiment wherein fore and aft aerodynamic components 2000 are disposed in a lateral orientation and reside at least partially under a centrally-disposed aerodynamic component 2000 having a longitudinal (i.e., fore-aft) orientation.

Figure 24:
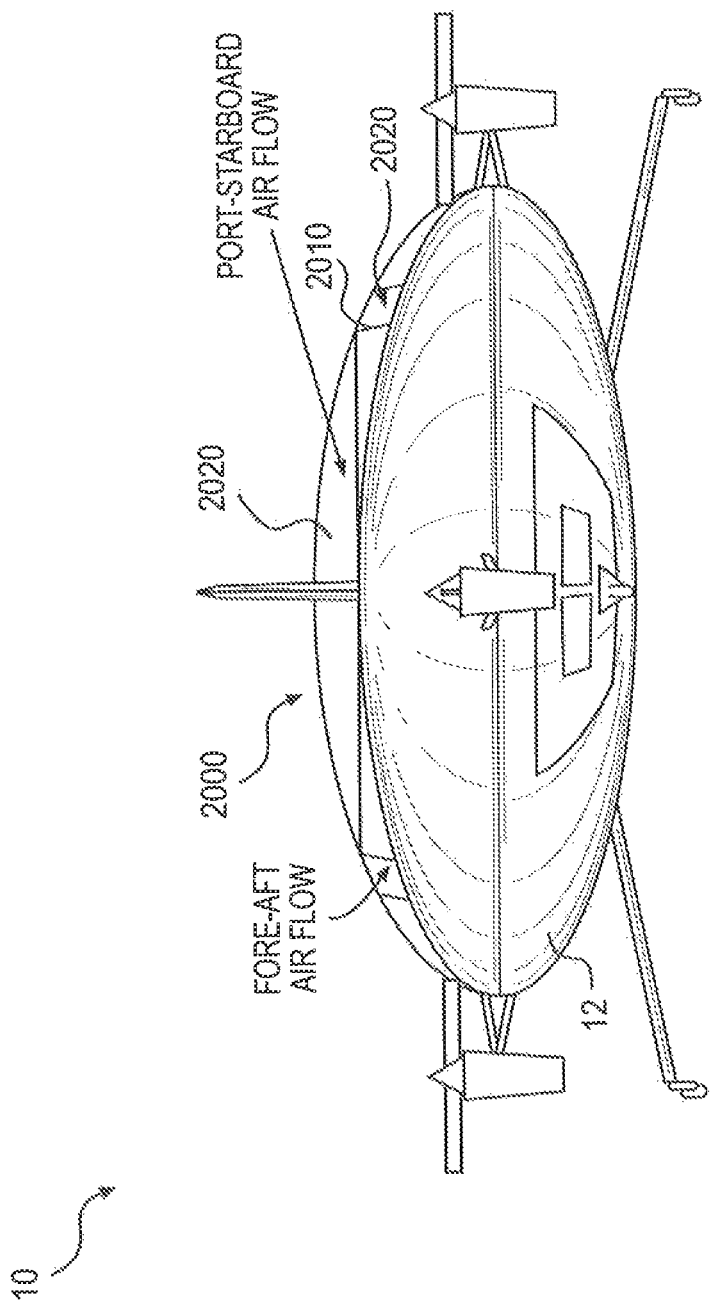
FIG. 24 is a rear view of another exemplary embodiment of an airship having multiple aerodynamic components.

FIG. 24 illustrates a similar embodiment to that shown in FIG. 20, except that the orientation of aerodynamic components 2000 is reversed. In the embodiment shown in FIG. 24, the centrally-disposed aerodynamic component 2000 has a port-starboard orientation (allowing lateral air flow), and fore-aft flow of air is allowed through laterally-disposed aerodynamic components 2000 that are overlapped by the centrally-disposed aerodynamic component 2000.

Flotation Structures

Figure 25:
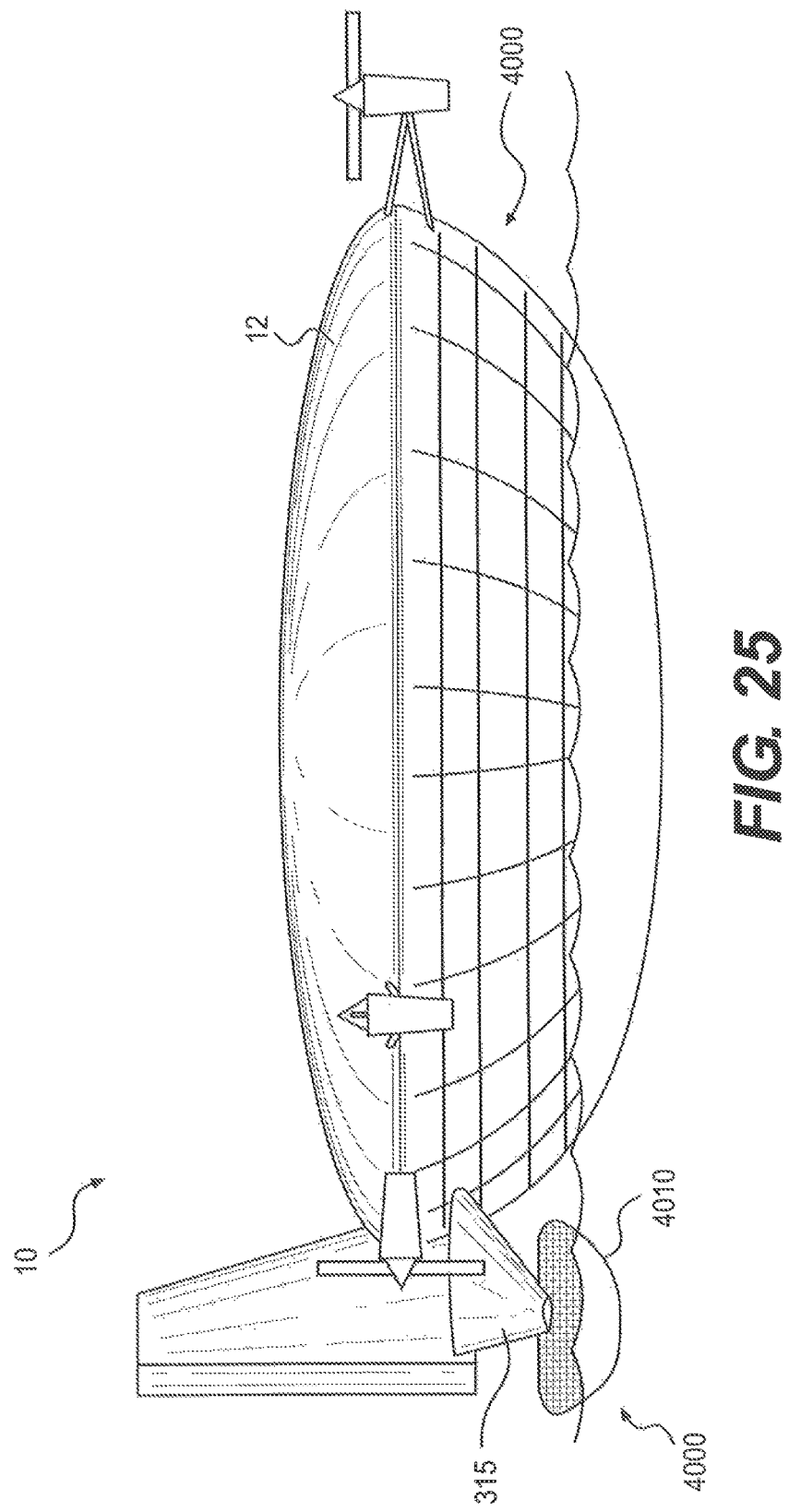
FIG. 25 is an exemplary airship embodiment having floatation structures.

According to some embodiments, airship 10 may include at least one floatation structure 4000 configured to support airship 10 for floatation on water during a water landing. In some embodiments, hull 12 may include a floatation structure. For example, as shown in FIG. 25, in some embodiments, hull 12 may include an enlarged lower portion configured to provide buoyancy. In such embodiments, hull 12 may be formed of a lightweight material, such as carbon fiber. Further, hull 12 may be a hollow structure or may be filled with a lightweight material, such as a foam, or a honeycomb structure. Also, in such embodiments, airship 10 may include additional floatation structures 4000, such as outboard pontoons 4010, attached, for example, to horizontal stabilizing members 315, as shown in FIG. 25. Outboard pontoons 4010 may be configured to provide stability to airship 10 while floating.

Figure 26:
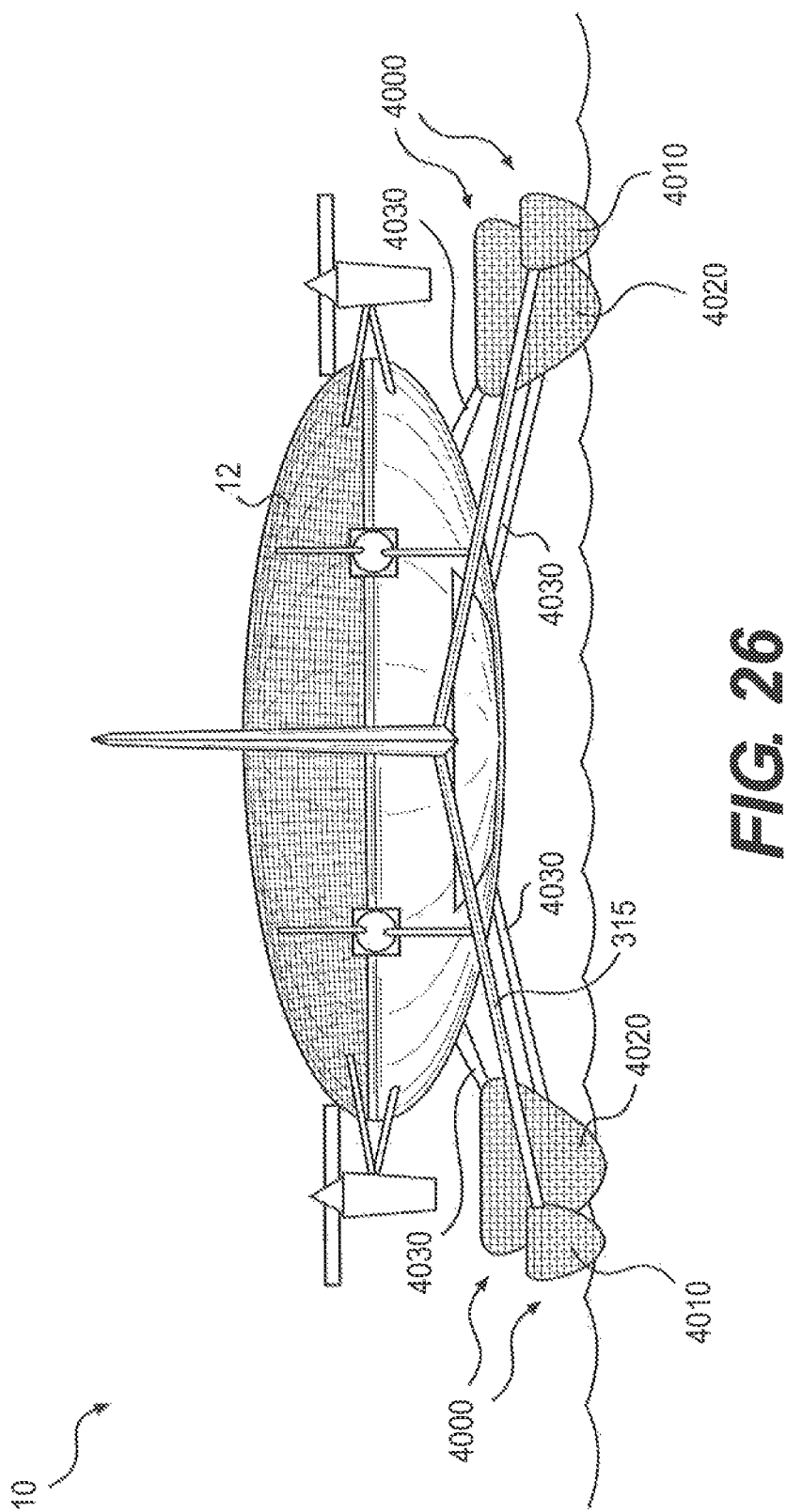
FIG. 26 is another exemplary airship embodiment having floatation structures.

In some embodiments, airship 10 may include multiple sets of floatation structures 4000. For example, as shown in FIG. 26, airship 10 may include outboard pontoons 4010 mounted to horizontal stabilizing members 315, as well as one or more main pontoons 4020 mounted to hull 12, e.g., by pontoon support members 4030. Main pontoons 4020 may be formed of the same or similar materials as discussed above with respect to outboard pontoons 4010. In some embodiments, outboard pontoons 4010 and/or main pontoons 4020 may have a shape similar to pontoons known to be used for a winged aircraft. Such pontoons may be formed with a boat hull-like configuration to facilitate forward travel while afloat (e.g., during takeoff and landing). In other embodiments, outboard pontoons 4010 and/or main pontoons 4020 may have a more simplistic shape. For example, when airship 10 is anticipated to be used exclusively as a VTOL aircraft, the pontoons may be configured for maximum buoyancy, as opposed to travel through water.

Figure 27:
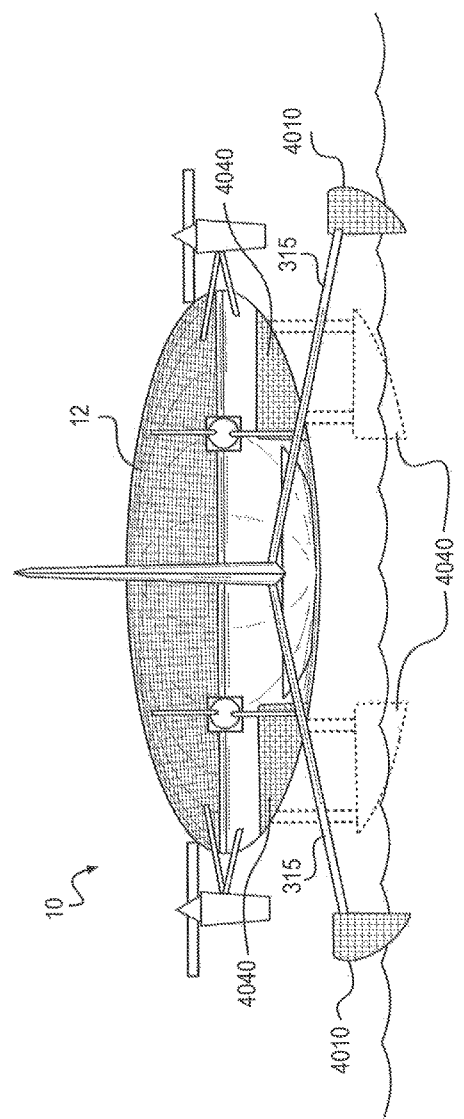
FIGS. 27 and 28 are exemplary airship embodiments having deployable floatation structures.
Figure 28:
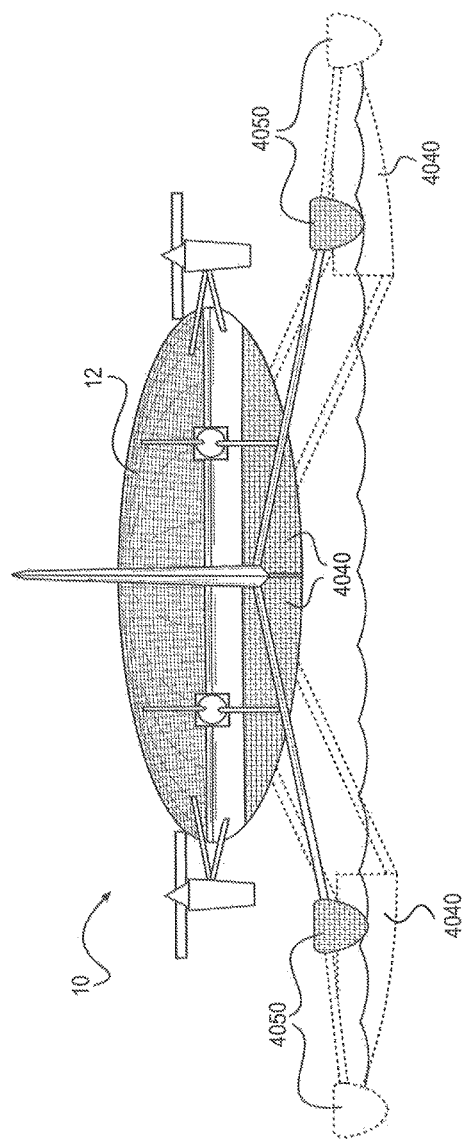

As shown in FIGS. 27 and 28, airship 10 may include deployable floatation structures 4000. For example, airship 10 may include deployable main pontoons 4040, which may be formed of a portion of hull 12 that may be extended to an outboard position, which is illustrated by broken lines in FIGS. 27 and 28. In some embodiments, deployable main pontoons 4040 may be extendable in a downward direction, as shown in FIG. 27. In other embodiments, deployable main pontoons 4040 may be extendable downward and laterally outward from roll axis 5, as shown in FIG. 28, providing a wide, stable stance. As also shown in FIG. 28, deployable outboard pontoons 4050 may be extendable beyond the distal tips of horizontal stabilizing members 315, to provide additional stability.

Deployable pontoons may be formed with surface aspects of a hydrofoil. In some embodiments, outboard pontoons 4010, main pontoons 4020, deployable main pontoons 4040, and/or deployable outboard pontoons 4050 may be formed with a cross-sectional shape similar to catamaran-style hydroplane race boat hulls, as shown, for example, in FIG. 27.

Deployable Apparatus

Figure 29:
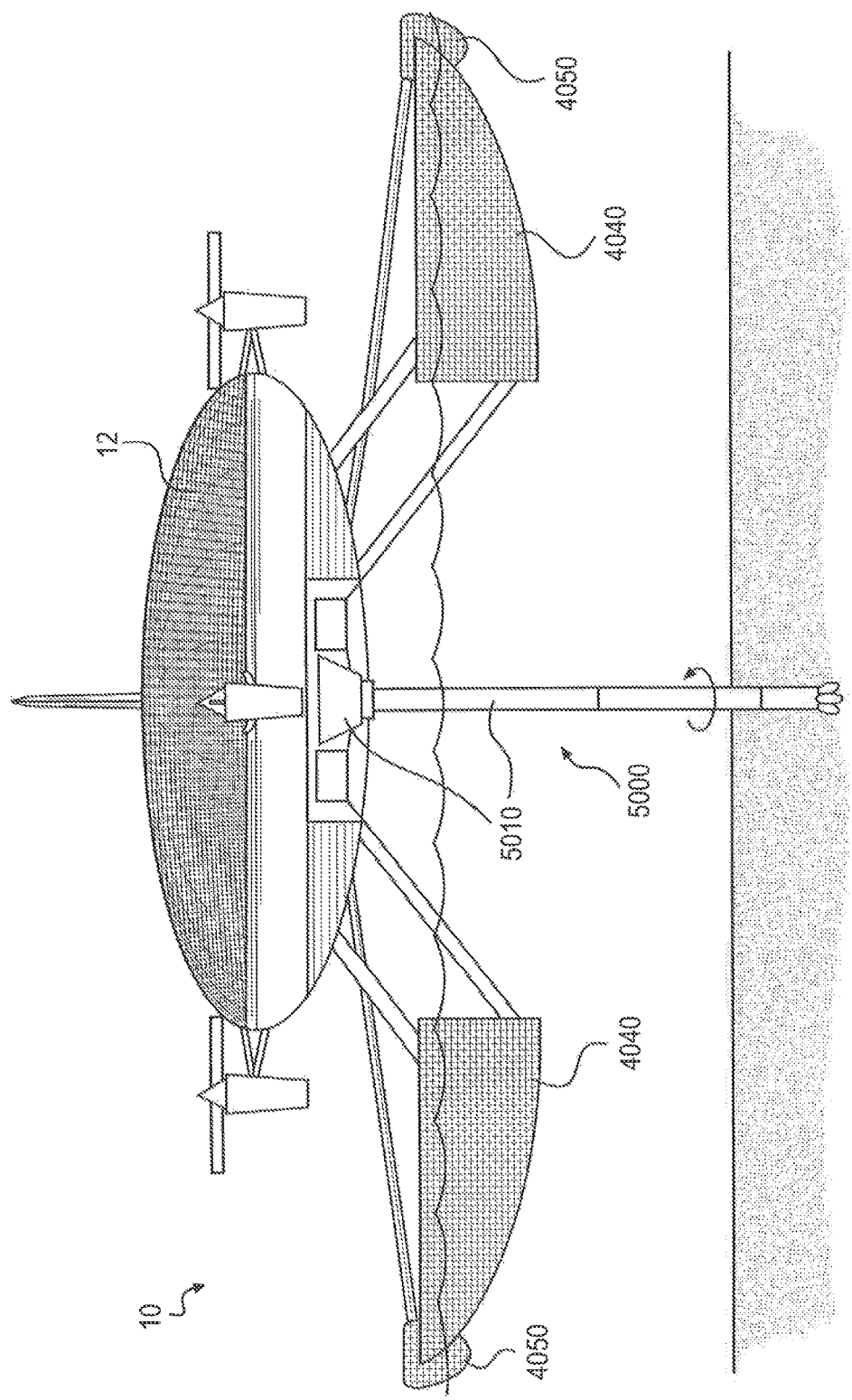
FIG. 29 is an exemplary airship embodiment having a deployable apparatus.

According to some embodiments, airship 10 may include a deployable apparatus 5000. Deployable apparatus 5000 may be housed within hull 12 and deployable from hull 12 for operation unrelated to the flight control or landing of airship 10. For example, as shown in FIG. 29, airship 10 may include a drilling apparatus 5010 that may be deployed from hull 12. A storage area within hull 12 may be configured to house components of drilling apparatus 5010, such as sections of drilling shaft. In some embodiments, storage area doors may be opened to expose deployable apparatus 5000. Alternatively, as illustrated in FIG. 29, deployable main pontoons 4040 may serve as the storage area doors, and drilling apparatus 5010 may when deployable main pontoons 4040 are deployed.

Flight control systems of airship 10 may be configured to maintain airship 10 stationary and stable during drilling operations. In some embodiments, airship 10 may include anchor-like devices (not shown), which may fix airship 10 to the sea floor, either via a tether or a more rigid attachment. In some embodiments, airship 10 may be maintained stationary via operation of the flight control system and/or using sea floor fixation, in such a manner to facilitate oil and/or natural gas drilling operations, or operations to harvest other natural resources.

In some embodiments, airship 10 may be suited for relatively shallow water drilling. Further, deployable apparatus 5000 may also be incorporated in an embodiment of airship 10 equipped for ground landing (as opposed to water landing). Also, in some embodiments, airship 10 may be configured for drilling shallow holes. For example, a suitable application may include drilling of holes for installation and/or construction of support pylons. Other types of apparatus may be deployable from airship 10. Such apparatuses may include, for example, construction equipment, demolition equipment, firefighting equipment, lifting and transportation equipment (e.g., a forklift-type apparatus), aircraft and/or watercraft refueling equipment, water removal/pumping equipment, weather monitoring equipment, etc.

INDUSTRIAL APPLICABILITY

The disclosed airship 10 may be implemented for use in a wide range of applications. For example, in some embodiments, airship 10 may be configured to perform functions involving traveling from one location to another. For instance, airship 10 may be configured to perform a function associated with at least one of lifting objects (e.g., construction lifting), elevating a platform, transporting items (e.g., freight), displaying items (e.g., advertisement), transporting humans (e.g., passenger carriage and/or tourism), and/or providing recreation.

Exemplary applications for disclosed airship 10 may include transporting equipment and/or supplies, such as construction equipment or budding components. For example, airship 10 may be used to transport oil pipeline construction equipment, as well as the piping itself. Airship 10 may be applicable for use in connection with building, operating, and/or maintaining pipelines, as well as logging and transportation of timber. Such applications may have particular use in remote areas, e.g., without transportation infrastructure, such as roads or airstrips, e.g., in Alaska, Canada, the Australian outback, the middle east, Africa, etc. Exemplary such areas may include tundra, desert, glaciers, snow and/or ice-covered land bodies, etc.

Another exemplary use of airship 10 may include crop dusting. Embodiments of airship 10 having engine configurations as disclosed herein may be capable of high levels of accuracy with respect to delivery of crop treatments. Advantages of such high accuracy may include the ability to dust crops in one plot of land without resulting in drift of sprayed chemicals onto neighboring plots. This may be advantageous when nearby plots include differing types of crops and/or if the nearby plots are, for example, maintained as organic.

In some embodiments, airship 10 may be configured to perform functions wherein the airship remains in substantially stationary flight. For example, airship 10 may be configured to perform a function including at least one of assembly of a structure, conducting cellular communications, conducting satellite communications, conducting surveillance, advertising, conducting scientific studies, and providing disaster support services. Airship 10 may include a platform or other cargo carrying structure configured to suspend communications equipment (e.g., satellite relay/receiver, cell tower, etc.) over a particular location. Because airship 10 may utilize, for example, associated control surfaces, propulsion assemblies 31, and its shape to remain suspended and substantially stationary over a given location, airship 10 may operate as a communications outpost in desired areas. Further, airship 10 may be employed for military or other reconnaissance/surveillance operations (e.g., for border patrol).

Operation of airship 10 may be performed by remotely controlling and/or utilizing manned flights of airship 10. Alternatively, or additionally, airship 10 may be operated by preprogrammed automated controls, particularly for applications involving stationary flight.

In some embodiments, airship 10 may be configured to fly at altitudes of 30,000 feet or more. Capability of flying at such altitudes may facilitate various aforementioned operations, such as surveillance, communications, scientific studies, etc. In addition, high altitude flight such as this may enable airship 10 to take advantage of jet streams, and also fly above adverse weather conditions and/or turbulence that may otherwise be present at lower altitudes. In addition, flying at high altitudes, above clouds, may expose solar panel 1010 to more sunlight. Further, at higher altitudes, sunlight may be more intense, further enhancing collection of solar energy.

In some embodiments, airship 10 may be configured for use at extreme high altitudes, e.g. as a replacement for satellites. Such embodiments of airship 10 may be configured for stationary or mobile flight at altitudes of more than 60,000 feet. Certain embodiments may be capable of normal operation at altitudes of more than 100,000 feet.

In some contemplated applications, airship 10 may be flown using solar energy during daylight hours and batteries at night and/or while flying beneath cloud cover. During flight in which airship 10 may be flown completely using solar energy, airship 10 may store any excess solar energy collected by using it to charge batteries 1030.

Certain embodiments of airship 10 disclosed herein may be equipped for water landing. Such embodiments may be applicable for landing in water of any depth. Therefore, airship 10 may be configured to land on a lake or ocean, airship 10 may also be configured to land on a swamp or other marshy site. Such airships may be used for applications at, or on, the water site. In addition, such airships may use the body of water/swamp as a landing site in an area that otherwise does not provide a landing place. For example, in order to travel to a heavily wooded area that does not provide a suitable landing site, an airship configured for water landing may land, for example, on a pond near the heavily wooded area. Airships equipped for water landing may be used, for example, to conduct research on a body of water, to perform construction, or to merely deliver materials and/or people to a location.

Some disclosed embodiments of airship 10 may include at least one deployable apparatus. As noted above, the deployable apparatus may be any of a number of different types of equipment. Airship 10 may be configured to implement the use of such equipment.

Whether configured for manned, un-manned, and/or automated flight, airship 10 may, according to some embodiments, be controlled by a computer 600. For example, propulsion assemblies 31 and control surfaces, among other things, may be controlled by a computer 600. FIG. 30 is a block diagram of an exemplary embodiment of a computer 600 consistent with the present disclosure. For example, as shown in FIG. 25, computer 600 may include a processor 605, a disk 610, an input device 615, a multi-function display (MFD) 620, an optional external device 625, and interface 630. Computer 600 may include more or fewer components as desired. In this exemplary embodiment, processor 605 includes a CPU 635, which is connected to a random access memory (RAM) unit 640, a display memory unit 645, a video interface controller (VIC) unit 650, and an input/output (I/O) unit 655. The processor may also include other components.

In this exemplary embodiment, disk 610, input device 615, MFD 620, optional external device 625, and interface 630 are connected to processor 605 via I/O unit 655. Further, disk 610 may contain a portion of information that may be processed by processor 605 and displayed on MFD 620.

Input device 615 includes the mechanism by which a user and/or system associated with airship 10 may access computer 600. Optional external device 625 may allow computer 600 to manipulate other devices via control signals. For example, a fly-by-wire or fly-by-light system may be included allowing control signals to be sent to optional external devices, including, for example, servo motors associated with propulsion unit mounts 430 and control surfaces associated with horizontal and vertical stabilizing member 310 and 315. "Control signals," as used herein, may mean any analog, digital, and/or signals in other formats configured to cause operation of an element related to control of airship 10 (e.g., a signal configured to cause operation of one or more control surfaces associated with airship 10). "Fly-by-wire," as used herein, means a control system wherein control signals may be passed in electronic form over an electrically conductive material (e.g., copper wire). Such a system may include a computer 600 between the operator controls and the final control actuator or surface, which may modify the inputs of the operator in accordance with pre-defined software programs, "Fly-by-light," as used herein, means a control system where control signals are transmitted similarly to fly-by-wire (i.e., including a computer 600), but wherein the control signals may transmitted via light over a light conducting material (e.g., fiber optics).

According to some embodiments, interface 630 may allow computer 600 to send and/or receive information other than by input device 615. For example, computer 600 may receive signals indicative of control information from flight controls 720, a remote control, and/or any other suitable device. Computer 600 may then process such commands and transmit appropriate control signals accordingly to various systems associated with airship 10 (e.g., propulsion system 30, vertical and horizontal control surfaces 350 and 360, etc.). Computer 600 may also receive weather and/or ambient condition information from sensors associated with airship 10 (e.g., altimeters, navigation radios, pitot tubes, etc.) and utilize such information for generating control signals associated with operating airship 10 (e.g., signals related to trim, yaw, and/or other adjustments).

According to some embodiments, computer 600 may include software and/or systems enabling other functionality. For example, computer 600 may include software allowing for automatic pilot control of airship 10. Automatic pilot control may include any functions configured to automatically maintain a preset course and/or perform other navigation functions independent of an operator of airship 10 (e.g., stabilizing airship 10, preventing undesirable maneuvers, automatic landing, etc.). For example, computer 600 may receive information from an operator of airship 10 including a flight plan and/or destination information. Computer 600 may use such information in conjunction with autopilot software for determining appropriate commands to propulsion units and control surfaces for purposes of navigating airship 10 according to the information provided. Other components or devices may also be attached to processor 605 via I/O unit 655. According to some embodiments, no computer may be used, or other computers may be used for redundancy. These configurations are merely exemplary, and other implementations will fall within the scope of the present disclosure.

According to some embodiments, it may be desirable for computer 600 to transmit in-flight signals configured to, for example, correct course heading and/or assist in stabilizing airship 10 independent of an operator of airship 10. For example, computer 600 may calculate, based on inputs from various sensors (e.g., altimeter, pitot tubes anemometers, etc.), a wind speed and direction associated with ambient conditions surrounding airship 10. Based on such information, computer 600 may determine a set of operational parameters that may maintain stability of airship 10. Such parameters may include, for example, propulsion unit parameters, control surface parameters, ballast parameters, etc. Computer 600 may then transmit commands consistent with such parameters assisting in maintaining stability and/or control of airship 10. For example, computer 600 may determine that as airship 10 gains altitude, the ballonet should be pressurized to prevent over-pressurization of first envelope 282. In such a situation, computer 600 may cause air pumps to activate, thereby pressurizing the ballonet to a desirable pressure. It should be noted that data associated with wind and other various effects on airship 10 (e.g., aerodynamic stresses) may be determined empirically and/or experimentally, and stored within computer 600. This may allow computer 600 to perform various actions consistent with safely navigating airship 10.

As noted above, according to some embodiments, once aloft, it may be desired to hold airship 10 substantially stationary over a desired area and at a desired altitude. For example, computer 600 and/or an operator may transmit control signals to propulsion system 30, vertical and horizontal control surfaces 350 and 360, the ballonet, and/or other systems associated with airship 10, such that airship 10 remains substantially stationary even where wind currents may cause airship 10 to be exposed to aerodynamic forces.

Although, for purposes of this disclosure, certain disclosed features are shown in some figures but not in others, it is contemplated that, to the extent possible, the various features disclosed herein may be implemented by each of the disclosed, exemplary embodiments. Accordingly, differing features disclosed herein are not to be interpreted as being mutually exclusive to different embodiments unless explicitly specified herein or such mutual exclusivity is readily understood, by one of ordinary skill in the art, to be inherent in view of the nature of the given features.

While the presently disclosed device and method have been described with reference to the specific embodiments thereof, it should be understood by those skilled in the art that various changes may be made and equivalents may be substituted without departing from the scope of the disclosure. In addition, many modifications may be made to adapt a particular situation, material, composition of matter, process, process step, or steps to the objective, spirit, and scope of the present invention. Other embodiments of the invention will be apparent to those skilled in the art from consideration of the specification and practice of the invention disclosed herein. It is intended that the specification and examples be considered as exemplary only.

What is claimed is:

1. An airship comprising;
    a hull configured to contain a gas;
    at least one propulsion assembly coupled to the hull and including a propulsion device; and
    at least two floatation structures configured to support the airship during a water landing, wherein:
        the at least two floatation structures comprises a pair of outboard pontoons and a pair of main pontoons; and
        the at least two floatation structures each comprise deployable pontoon housed inside the hull and configured to be extendable outside of the hull,
    at least two support members connected to the hull and extending away from each other and the hull,
    wherein each of the at least two support members is attached at one end to the hull and at a second end to an end portion of one of the pair of outboard pontoons or one of the pair of main pontoons to provide buoyancy to the hull when the floatation structure is in water; and
an empennage assembly including a pair of horizontal stabilizing members that constitute two support members of the at least two support members.

2. The airship of claim 1, wherein the hull comprises a support structure, and wherein the at least one propulsion assembly comprises:
a first propulsion assembly operatively affixed to a first section of the support structure and configured to control a roll motion of the airship;
a second propulsion assembly operatively affixed to a second section of the support structure and configured to control a yaw motion of the airship; and
a third propulsion assembly operatively affixed to a third section of the support structure and configured to control a pitch motion of the airship.

3. The airship of claim 1, wherein an outer surface of the hull comprises:
a solar energy converting material.

4. The airship of claim 1, further comprising:
at least one compartment disposed substantially inside the hull; and
at least one transport system configured to lower or raise the at least one compartment out of or into the hull.

5. The airship of claim 1, further comprising:
one or more containers disposed inside the hull and configured to contain a lighter-than-air gas.

6. The airship of claim 1, wherein the hull comprises:
a first envelope; and
a second envelope,
wherein a space is defined between the first and second envelopes.

7. The airship of claim 1, wherein the empennage assembly is operatively connected to a support structure of the hull and configured to provide at least one of stabilization and navigation functionality to the airship.

8. The airship of claim 1, wherein the pair of main pontoons are larger than the pair of outboard pontoons.

9. The airship of claim 1, wherein:
the at least two support members includes a first pair of support members attaching the pair of outboard pontoons to the hull and a second pair of support members attaching the pair of main pontoons to the hull,
the first pair of support members are attached to the hull at a rear portion of the hull, and
the second pair of support members are attached to the hull at a central portion of the hull.

10. The airship of claim 9, further comprising:
an empennage assembly operatively connected to a support structure of the hull and configured to provide at least one of stabilization and navigation functionality to the airship, the empennage assembly including a pair of horizontal stabilizing members,
wherein the second pair of support members are the horizontal stabilizing members of the empennage assembly.

11. The airship of claim 1, wherein the pair of outboard pontoons are separated from each other by a distance greater than a largest width of the hull.

12. An airship comprising:
a hull configured to contain a gas and including an enlarged lower portion;
at least one propulsion assembly coupled to the hull and including a propulsion device; and
at least two support members connected to the hull and extending away from each other and the hull;
at least one floatation structure configured to support the airship during a water landing, wherein:
the at least one floatation structure includes the enlarged lower portion of the hull,
the enlarged lower portion of the hull is formed of a first material configured to provide buoyancy to the hull when the hull is in water, and
the enlarged lower portion of the hull is hollow or filled with a second material configured to provide buoyancy to the hull when the hull is in water;
the at least one floatation structure further includes a pair of main pontoons and a pair of outboard pontoons connected to the hull by the at least two support members, wherein each of the at least two support members is attached at one end to the hull and at a second end to an end portion of one of the pair of outboard pontoons to provide buoyancy to the hull when the floatation structure is in water;
wherein each of the main pontoons and the outboard pontoons comprise a deployable pontoon housed inside the hull and configured to be extendable outside of the hull; and
an empennage assembly operatively connected to a support structure of the hull and including a pair of horizontal stabilizing members, wherein the horizontal stabilizing members of the empennage assembly constitute two support members of the at least two support members.

13. The airship of claim 12, wherein the empennage assembly is configured to provide at least one of stabilization and navigation functionality to the airship.

14. The airship of claim 12, wherein the pair of outboard pontoons are separated from each other by a distance greater than a largest width of the hull.

15. The airship of claim 12, wherein a bottom of the pair of outboard pontoons is above a bottom of the enlarged lower portion of the hull when the hull and outboard pontoons are in water.

* * * * *